US011729688B2

(12) United States Patent
Jiang et al.

(10) Patent No.: US 11,729,688 B2
(45) Date of Patent: Aug. 15, 2023

(54) DATA LOSSLESS HANDOVER

(71) Applicant: Nokia Solutions and Networks Oy, Espoo (FI)

(72) Inventors: Yiming Jiang, Shanghai (CN); Dingjun He, Shanghai (CN); Michael Timmers, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 132 days.

(21) Appl. No.: 17/471,947

(22) Filed: Sep. 10, 2021

(65) Prior Publication Data

US 2022/0095188 A1 Mar. 24, 2022

(30) Foreign Application Priority Data

Sep. 23, 2020 (CN) ......................... 202011011613.7

(51) Int. Cl.
*H04W 36/18* (2009.01)
*H04W 84/12* (2009.01)

(52) U.S. Cl.
CPC ............ *H04W 36/18* (2013.01); *H04W 84/12* (2013.01)

(58) Field of Classification Search
CPC ... H04W 36/18; H04W 84/12; H04W 36/023; H04W 36/0016; H04W 36/08
See application file for complete search history.

(56) References Cited

U.S. PATENT DOCUMENTS

2007/0081555 A1* 4/2007 Yaqub .................. H04W 36/02 370/468
2010/0322194 A1* 12/2010 Hu ...................... H04W 36/023 370/331
2012/0051349 A1* 3/2012 Teyeb .................. H04W 36/02 370/338
2017/0245184 A1* 8/2017 Nagesh Shetigar ..... H04J 11/00
2021/0282144 A1* 9/2021 Barton ................. H04W 72/52

* cited by examiner

*Primary Examiner* — Hashim S Bhatti
(74) *Attorney, Agent, or Firm* — Harness, Dickey & Pierce, P.L.C.

(57) ABSTRACT

In one embodiment, the method includes if a first network device having a first path with a second network device determines that a terminal device is to be handed over from the second network device to a third network device, establishing a second path between the first and third network devices; disabling data transmission for the terminal device via the first path; transmitting a handover indication to the second network device to cause it to suspend transmission of buffered data to the terminal device and to transmit remaining data to the third network device; and upon receiving a completion indication from the second network device that transmission of the remaining data is complete, enabling data transmission for the terminal device via the second path.

16 Claims, 10 Drawing Sheets

DATA LOSSLESS HANDOVER

CROSS-REFERENCE TO RELATED APPLICATIONS

This application is based on and claims priority under 35 U.S.C. § 119 to Chinese Patent Application No. 2020110116137, filed on Sep. 23, 2020, the disclosure of which is incorporated by reference herein in its entirety

FIELD

Example embodiments of the present disclosure generally relate to the field of communication, and in particular to methods, devices, apparatuses and a computer readable medium for handing a terminal device over from a network device to another network device without loss of data.

BACKGROUND

The Wi-Fi technology is one of the most popular and widely deployed wireless access network technologies in the world. Through the development of the Wi-Fi technology from the legacy 802.11g and 802.11n to 802.11ac and 802.11ax in recent years, the Wi-Fi technology can provide a throughput capability exceeding billions of bits per second in a Wi-Fi access network and can meet performance requirements of various kinds of end user services, including voice over internet, 4k/8k video streaming, online gaming applications, and the like. With the evolution of the Wi-Fi technology, Wi-Fi mesh networks have started to be widely deployed, so as to ensure good Wi-Fi signal coverage in houses or in public areas.

The Wi-Fi mesh network solution is intended to optimize the coverage of a Wi-Fi wireless network in a geographic area. This solution can support band steering and fast roaming of terminal devices, so as to provide the terminal devices with the best Wi-Fi signals and the highest Wi-Fi throughput. However, in conventional Wi-Fi mesh networks as well as in other communication networks, the handover procedure for performing a handover of a terminal device between network devices still has deficiencies and needs to be improved.

SUMMARY

In general, example embodiments of the present disclosure provide a solution for handing a terminal device over from a network device to another network device without loss of data.

In a first aspect, there is provided a method. The method comprises in accordance with a determination, by a first network device having a first path with a second network device, that a terminal device is to be handed over from the second network device to a third network device, establishing a second path between the first and third network devices. The method also comprises disabling data transmission for the terminal device from the first network device to the second network device via the first path. The method also comprises transmitting, to the second network device, a handover indication for the terminal device to cause the second network device to suspend transmission of buffered data to the terminal device and to transmit remaining data of the buffered data to the third network device. The method further comprises in accordance with reception, from the second network device, a completion indication that transmission of the remaining data is complete, enabling data transmission for the terminal device from the first network device to the third network device via the second path.

In a second aspect, there is provided a method. The method comprises receiving, by a second network device, from a first network device having a first path with the second network device, a handover indication that a terminal device is to be handed over from the second network device to a third network device. The method also comprises suspending transmission of buffered data at the second network device to the terminal device. The method also comprises transmitting remaining data of the buffered data to the third network device having a second path with the first network device. The method further comprises in accordance with a determination that transmission of the remaining data is complete, transmitting, to the first network device, a completion indication that the transmission of the remaining data is complete.

In a third aspect, there is provided a method. The method comprises in accordance with a determination by a third network device that a terminal device associates to the third network device, establishing a second path between a first network device and the third network device, the first network device having a first path with a second network device. The method also comprises receiving, from the second network device, remaining data of buffered data at the second network device, the remaining data failing to be transmitted by the second network device to the terminal device due to suspension of transmission of the buffered data. The method further comprises transmitting the remaining data to the terminal device.

In a fourth aspect, there is provided a first network device. The first network device comprises at least one processor and at least one memory storing computer program codes. The at least one memory and the computer program codes are configured, with the at least one processor, to cause the first network device to in accordance with a determination, by the first network device having a first path with a second network device, that a terminal device is to be handed over from the second network device to a third network device, establish a second path between the first and third network devices. The at least one memory and the computer program codes are also configured, with the at least one processor, to cause the first network device to disable data transmission for the terminal device from the first network device to the second network device via the first path. The at least one memory and the computer program codes are also configured, with the at least one processor, to cause the first network device to transmit, to the second network device, a handover indication for the terminal device to cause the second network device to suspend transmission of buffered data to the terminal device and to transmit remaining data of the buffered data to the third network device. The at least one memory and the computer program codes are further configured, with the at least one processor, to cause the first network device to in accordance with reception, from the second network device, a completion indication that transmission of the remaining data is complete, enable data transmission for the terminal device from the first network device to the third network device via the second path.

In a fifth aspect, there is provided a second network device. The second network device comprises at least one processor and at least one memory storing computer program codes. The at least one memory and the computer program codes are configured, with the at least one processor, to cause the second network device to receive, from a first network device having a first path with the second network device, a handover indication that a terminal device is to be handed over from the second network device to a third network device. The at least one memory and the computer program codes are also configured, with the at least one processor, to cause the second network device to suspend transmission of buffered data at the second network device to the terminal device. The at least one memory and the computer program codes are also configured, with the at least one processor, to cause the second network device to transmit remaining data of the buffered data to the third network device having a second path with the first network device. The at least one memory and the computer program codes are further configured, with the at least one processor, to cause the second network device to in accordance with a determination that transmission of the remaining data is complete, transmit, to the first network device, a completion indication that the transmission of the remaining data is complete.

In a sixth aspect, there is provided a third network device. The third network device comprises at least one processor and at least one memory storing computer program codes. The at least one memory and the computer program codes are configured, with the at least one processor, to cause the third network device to in accordance with a determination that a terminal device associates to the third network device, establish a second path between a first network device and the third network device, the first network device having a first path with a second network device. The at least one memory and the computer program codes are also configured, with the at least one processor, to cause the third network device to receive, from the second network device, remaining data of buffered data at the second network device, the remaining data failing to be transmitted by the second network device to the terminal device due to suspension of transmission of the buffered data. The at least one memory and the computer program codes are further configured, with the at least one processor, to cause the third network device to transmit the remaining data to the terminal device.

In a seventh aspect, there is provided an apparatus. The apparatus comprises means for, in accordance with a determination, by a first network device having a first path with a second network device, that a terminal device is to be handed over from the second network device to a third network device, establishing a second path between the first and third network devices. The apparatus also comprises means for disabling data transmission for the terminal device from the first network device to the second network device via the first path. The apparatus also comprises means for transmitting, to the second network device, a handover indication for the terminal device to cause the second network device to suspend transmission of buffered data to the terminal device and to transmit remaining data of the buffered data to the third network device. The apparatus further comprises means for, in accordance with reception, from the second network device, a completion indication that transmission of the remaining data is complete, enabling data transmission for the terminal device from the first network device to the third network device via the second path.

In an eighth aspect, there is provided an apparatus. The apparatus comprises means for receiving, by a second network device, from a first network device having a first path with the second network device, a handover indication that a terminal device is to be handed over from the second network device to a third network device. The apparatus also comprises means for suspending transmission of buffered data at the second network device to the terminal device. The apparatus also comprises means for transmitting remaining data of the buffered data to the third network device having a second path with the first network device. The apparatus further comprises means for, in accordance with a determination that transmission of the remaining data is complete, transmitting, to the first network device, a completion indication that the transmission of the remaining data is complete.

In a ninth aspect, there is provided an apparatus. The apparatus comprises means for, in accordance with a determination by a third network device that a terminal device associates to the third network device, establishing a second path between a first network device and the third network device, the first network device having a first path with a second network device. The apparatus also comprises means for receiving, from the second network device, remaining data of buffered data at the second network device, the remaining data failing to be transmitted by the second network device to the terminal device due to suspension of transmission of the buffered data. The apparatus further comprises means for transmitting the remaining data to the terminal device.

In a tenth aspect, there is provided a non-transitory computer readable medium storing program instructions for causing an apparatus to perform at least the method according to any of the first, second and third aspects.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1A:
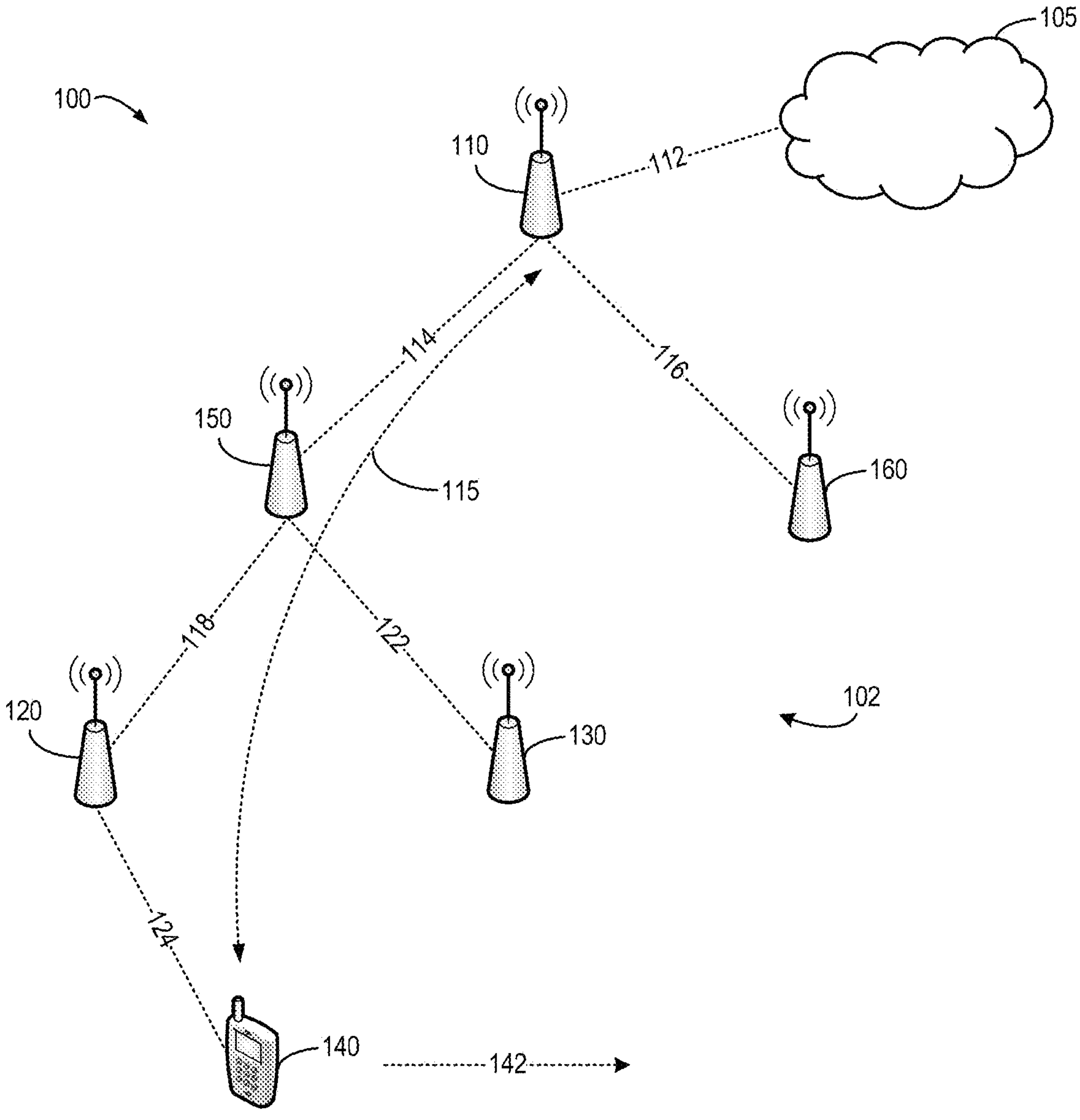
FIGS. 1A and 1B illustrate schematic diagrams of a communication environment in which some example embodiments of the present disclosure can be implemented.

Principles of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the example embodiment described may include a particular feature, structure, or characteristic, but it is not necessary that every example embodiment includes the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" or the like may be used herein to describe various elements, these elements should not be limited by these terms. These terms are only used to distinguish one element from another element. For example, a first element could also be termed as a second element, and similarly, a second element could also be termed as a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, components and/or the like, but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network devices.

As used herein, the term "communication network" refers to a network following any suitable communication standards, such as, 5G NR, Long Term Evolution (LTE), LTE-Advanced (LTE-A), Wideband Code Division Multiple Access (WCDMA), High-Speed Packet Access (HSPA), Narrow Band Internet of Things (NB-IoT), and so on. Further, the communications between a terminal device and a network device in the communication network may be performed according to any suitable generation communication protocols, including but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will also be future type communication technologies and systems in which the present disclosure may be embodied. It should not be seen as limiting the scope of the present disclosure to only the aforementioned systems.

As used herein, the term "network device" refers to a node in a communication network via which a terminal device can access the network and receive services therefrom. The network device may refer to a base station (BS) or an access point (AP), for example, a node B (NodeB or NB), a radio access network (RAN) node, an evolved NodeB (eNodeB or eNB), a NR NB (also referred to as a gNB), a Remote Radio Unit (RRU), a radio header (RH), an infrastructure device for a V2X (vehicle-to-everything) communication, a transmission and reception point (TRP), a reception point (RP), a remote radio head (RRH), a relay, an integrated access and backhaul (IAB) node, a low power node such as a femto BS, a pico BS, and so forth, depending on the applied terminology and technology.

As used herein, the term "terminal device" refers to any end device that may be capable of wireless communications. By way of example rather than limitation, a terminal device may also be referred to as a communication device, user equipment (UE), an end user device, a subscriber station (SS), an unmanned aerial vehicle (UAV), a portable subscriber station, a mobile station (MS), or an access terminal (AT). The terminal device may include, but not limited to, a mobile phone, a cellular phone, a smart phone, a voice over IP (VoIP) phone, a wireless local loop phone, a tablet, a wearable terminal device, a personal digital assistant (PDA), a portable computer, a desktop computer, an image capture terminal device such as a digital camera, a gaming terminal device, a music storage and playback appliance, a vehicle-mounted wireless terminal device, a wireless endpoint, a mobile station, laptop-embedded equipment (LEE), laptop-mounted equipment (LME), a USB dongle, a smart device, wireless customer-premises equipment (CPE), an Internet of Things (IoT) device, a watch or other wearable, a head-mounted display (HMD), a vehicle, a drone, a medical device and application (for example, a remote surgery device), an industrial device and application (for example, a robot and/or other wireless devices operating in an industrial and/or an automated processing chain contexts), a consumer electronics device, a device operating on commercial and/or industrial wireless networks, and the like. In the following description, the terms "terminal device," "communication device," "terminal," "user equipment" and "UE" may be used interchangeably.

As mentioned above, the Wi-Fi mesh network solution is intended to optimize the coverage of a Wi-Fi wireless network in a geographic area. This solution can support band steering and fast roaming of terminal devices, so as to provide the terminal devices with the best Wi-Fi signals and the highest Wi-Fi throughput. For this purpose, the Institute of Electrical and Electronic Engineers (IEEE) and the Wi-Fi Alliance (WFA) have defined various Wi-Fi specifications to enhance user experiences in the Wi-Fi mesh networks. These Wi-Fi specifications include the 802.11k specification, the 802.11r specification, and the 802.11v specification. The 802.11k specification can support Wi-Fi measurements and neighbor reporting to provide more comprehensive Wi-Fi real environment statistics. The 802.11r specification can support the fast basic service set (BSS) transition to shorten the transition period of a Wi-Fi BSS handover of a terminal device. The 802.11v specification can support wireless network managements so as to support elegant BSS transition request triggers. With all these Wi-Fi specifications to guide the design of Wi-Fi mesh products, the Wi-Fi mesh products can offer improved Wi-Fi performance, for example, better Wi-Fi physical connections and less interruptions of an end user service during the phase of a Wi-Fi BSS handover action.

However, in conventional Wi-Fi mesh networks as well as in other communication networks, the handover procedure for performing a handover of a terminal device between network devices still has problems and needs to be improved. One of these problems that may need to be addressed is obvious data (such as packets) loss during a handover of a terminal device and its impact on a user service, which can happen when the terminal device performs a BSS handover in a Wi-Fi mesh network or other communication networks. A BSS transition for a terminal device to be handed over from an original network device (such as an original access point) to a target network device (such as a target access point) may take around 100 milliseconds for a fast roaming procedure. When the terminal device starts a handover procedure, the terminal device may trigger an authentication process and a re-association process with the target network device and disconnect from the original network device. During this handover period, downstream data from the root network device in the Wi-Fi mesh network to the terminal device may be transmitted to the original network device, and may be put into a transmission buffer of the original network device until a new path is available between the terminal device and the root network device via the target network device.

Since the terminal device has been disconnected from the original network device after the handover, the original network device may release the context of the terminal device and drop all the buffered data for this terminal device. The dropped data may include data in the transmission buffer of the original network device before the handover procedure, and data put into the transmission buffer during the handover procedure. As mentioned, it may take around 100 milliseconds for a BSS transition period, and it may additionally take around 100 milliseconds for the original network device to buffer the amount of buffered data before the handover procedure. Accordingly, the service impact period experienced by an end user may be around hundreds of milliseconds to several seconds in all kinds of Wi-Fi mesh products. Although this period may be not very long, it can lower the end user experience a lot, especially for those services sensitive to the data loss, such as, voice over internet, video streaming, and the like. For example, the problem of data loss may lead to glitches during a voice call by an end user and video freezing during the BSS handover period.

In order to reduce the length of time that the Wi-Fi connectivity is lost between the terminal device and the Wi-Fi mesh network during a BSS transition, the fast BSS transition protocol is defined by the IEEE as the 802.11r specification. The fast BSS transition protocol defines a fast BSS transition procedure with an authentication process based on a fast BSS transition authentication algorithm (FTAA) and the re-association, so as to reduce the BSS transition period with 4-way handshake procedure omitted. The BSS transition procedure with 802.11r enabled may take around 50 milliseconds of time in a normal case, and the BSS transition procedure with 802.11r disabled may take around 100 milliseconds of time in a normal case. Also, the time can have dependency on the performance of the terminal device and the Wi-Fi dynamic environment.

Although the fast BSS transition protocol can provide around 50 milliseconds of time reduction for the BSS transition procedure, it can only improve the user experience slightly because it cannot resolve the essential problem of data loss during a BSS transition of a terminal device. According to the user experiences during Wi-Fi handovers for various kinds of Wi-Fi mesh products in the market, the service impact period is around hundreds of milliseconds to several seconds caused by the data loss during a BSS transition of a terminal device. There are no feasible solutions to address this common problem of data loss during a handover of a terminal device cross Wi-Fi mesh products in the market. More generally, the similar issue may also exist in other communication networks and there are no effective solutions for solving the issue.

In view of the above problems and other potential problems in the traditional solutions, example embodiments of the present disclosure provide a solution for handing a terminal device over from a network device to another network device without loss of data. In the solution provided by the example embodiments of the present disclosure, if a first network device which has a first path with a second network device determines that a terminal device is to be handed over from the second network device to a third network device, the first network device can establish a second path between the first network device and the third network device. Also, the first network device can disable data transmission for the terminal device from the first network device to the second network device via the first path.

In addition, the first network device may transmit a handover indication for the terminal device to the second network device, which handover indication can cause the second network device to suspend transmission of buffered data to the terminal device and to transmit remaining data of the buffered data to the third network device. Further, if the first network device receives a completion indication from the second network device which indicates that transmission of the remaining data is complete, then the first network device may enable data transmission for the terminal device from the first network device to the third network device via the second path.

Through the solution of the example embodiments of the present disclosure, during the handover of the terminal device from the second network device to the third network device, the first network device can avoid transmitting data for the terminal device to the second network device by disabling the data transmission via the first path. Additionally, the remaining data of the buffered data at the second network device, which are not transmitted to the terminal device by the second network device, can be transmitted from the second network device to the third network device, and thus the third network device can then transmit the remaining data to the terminal device. As a result, no data for the terminal device may be lost during the handover of the terminal device from the second network device to the third network device, thereby improving the user experience of the communication service provided by the communication network. Principles and implementations of example embodiments of the present disclosure will be described in detail below with reference to the figures.

Figure 1B:
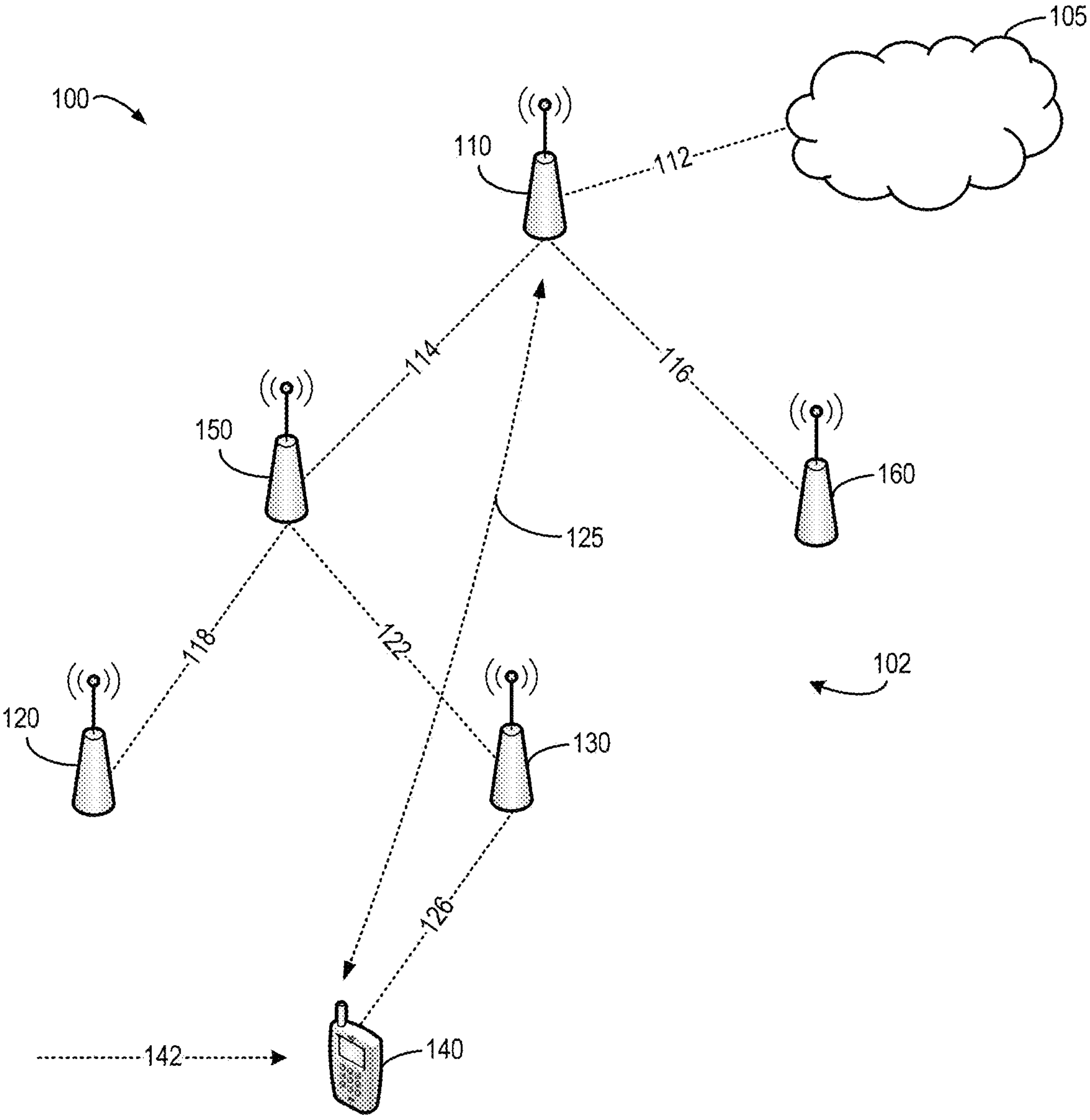

FIGS. 1A and 1B illustrate schematic diagrams of a communication environment 100 in which some example embodiments of the present disclosure can be implemented. As shown in FIGS. 1A and 1B, the communication environment 100 (also referred to as a communication system 100) may include a network 102 and an external network 105 outside the network 102. The network 102 can include a first network device 110, a second network device 120, a third network device 130, a fourth network device 150, and a fifth network device 160. Various communication links can be created between these network devices in the network 102, such as, a communication link 114 between the first network device 110 and the fourth network device 150, a communication link 116 between the first network device 110 and the fifth network device 160, a communication link 118 between the fourth network device 150 and the second network device 120, and a communication link 122 between the fourth network device 150 and the third network device 130. It is to be understood that the communication links 114, 116, 118, and 122 are depicted as examples of the communication links between the network devices without suggesting any limitation. In other example embodiments, the network 102 can include more or less network devices and any two of these network devices can have a communication link. In addition to these communication links between the network devices, the first network device 110 can be connected to the external network 105 via a communication link 112.

It should be noted that any of the communication links 112, 114, 116, 118 and 122 may be a wireless link, a wired link, or a combination thereof. In some example embodiments, these communication links may be any form of connection or coupling that enables data communication or control signal communication between these network devices, including but not limited to, coaxial cables, fiber optic cables, twisted pairs, or wireless technologies (such as infrared, radio, microwave, or the like). In some example embodiments, the communication links may also include, but not limited to, network cards, hubs, modems, repeaters, bridges, switches, routers and other devices used for network connections, as well as various network connection lines and wireless links or the like. In other example embodiments, the communication links may include a computer network, a communication network, or other wired or wireless networks. In addition, since the communication links 114, 116, 118 and 122 are links between network devices, they can also be referred to as backhauls as used herein.

In the example scenario shown in FIG. 1A, a terminal device 140 connects to the second network device 120, and thus there is a communication link 124 between the second network device 120 and the terminal device 140. Through the communication link 124, the terminal device 140 can access the network 102 and communicate with an external device in the external network 105 via the network 102. To this end, a first path 115 can be established between the first network device 110 and the terminal device 140 via the second network device 120. In particular, in the example scenario of FIG. 1A, the first path 115 may include the communication link 114 between the first network device 110 and the fourth network device 150, the communication link 118 between the fourth network device 150 and the second network device 120, and the communication link 124 between the second network device 120 and the terminal device 140.

In a downstream data transmission via the first path 115, the first network device 110 can receive data for the terminal device 140 from the external device in the external network 105 via the communication link 112, and may transmit the data to the fourth network device 150 via the communication link 114. Then, the fourth network device 150 can transmit the data to the second network device 120 via the communication link 118. Next, the second network device 120 can transmit the data to the terminal device 140 via the communication link 124. In an upstream data transmission via the first path 115, the terminal device 140 can generate data for the external device in the external network 105, and may transmit the date to the second network device 120 via the communication link 124. Then, the second network device 120 can transmit the data to the fourth network device 150 via the communication link 118. Next, the fourth network device 150 can transmit the data to the first network device 110 via the communication link 114. Afterwards, the first network device 110 can transmit the data to the external device in the external network 105 via the communication link 112. It is seen that the first path 115 can be used to forward data associated with the terminal device 140 and thus can also be referred to as a first forwarding path hereinafter.

In some example embodiments, the data transmitted between the first network device 110, the second network device 120, the third network device 130, the terminal device 140, and the external device in the external network 105 can be in the form of data packets or packets. However, it should be understood that example embodiments of the present disclosure are equally applicable to data of any other suitable forms that can be transmitted between the first network device 110, the second network device 120, the third network device 130, the terminal device 140, and an external device in the external network 105. For example, these data forms may include, but not limited to, data frames or frames, datagrams, data segments or segments, messages, and the like.

As further shown in FIGS. 1A and 1B, the terminal device 140 is moving along a direction 142 in the example scenarios of FIGS. 1A and 1B. With the movement of the terminal device 140 in the direction 142, the terminal device 140 may be out of the coverage of the second network device 120 and enter the coverage of the third network device 130 at some time. In this event, the terminal device 140 can be handed over from the second network device 120 to the third network device 130. For instance, in the example scenario as shown in FIG. 1B, the terminal device 140 already disconnects from the second network device 120 and instead connects to the third network device 130.

As used herein, if the terminal device 140 is handed over from the second network device 120 to the third network device 130, then the second network device 120 can also be referred to as a source network device, an original network device, a current network device or an old network device, whereas the third network device 130 can also be referred to as a target network device or a new network device. In addition, although the handover of the terminal device 140 is due to the movement of the terminal device 140 in the example scenarios as depicted in FIGS. 1A and 1B, this depiction is only for example without suggesting any limitation. In other example embodiments, the handover of the terminal device 140 may be performed for any other possible reasons, for example, a failure of the second network device 120.

As shown in FIG. 1B, there is a communication link 126 between the third network device 130 and the terminal device 140. Through the communication link 126, the terminal device 140 can also access the network 102 and communicate with an external device in the external network 105 via the network 102. To this end, a second path 125 can be established between the first network device 110 and the terminal device 140 via the third network device 130. In particular, in the example scenario of FIG. 1B, the second path 125 may include the communication link 114 between the first network device 110 and the fourth network device 150, the communication link 122 between the fourth network device 150 and the third network device 130, and the communication link 126 between the third network device 130 and the terminal device 140.

In a downstream data transmission via the second path 125, the first network device 110 can receive data for the terminal device 140 from the external device in the external network 105 via the communication link 112, and may transmit the data to the fourth network device 150 via the communication link 114. Then, the fourth network device 150 can transmit the data to the third network device 130 via the communication link 122. Next, the third network device 130 can transmit the data to the terminal device 140 via the communication link 126. In an upstream data transmission via the second path 125, the terminal device 140 can generate data for the external device in the external network 105, and may transmit the data to the third network device 130 via the communication link 126. Then, the third network device 130 can transmit the data to the fourth network device 150 via the communication link 122. Next, the fourth network device 150 can transmit the data to the first network device 110 via the communication link 114. Afterwards, the first network device 110 can transmit the data to the external device in the external network 105 via the communication link 112. It is seen that the second path 125 can be used to forward data associated with the terminal device 140 and thus can also be referred to as a second forwarding path hereinafter.

In some example embodiments, the network 102 can be a Wi-Fi mesh network, the first network device 110 can be a root access point in the Wi-Fi mesh network, and each of the second network device 120 and the third network device 130 can be a non-root access point in the Wi-Fi mesh network. For example, the first network device 110, the second network device 120, the third network device 130, the fourth network device 150, and the fifth network device 160 may be part of a plurality of AP nodes formed the Wi-Fi mesh network within the same mobility domain. The first network device 110 can be a root AP, which may be the controller AP of the Wi-Fi mesh network and can contain the wide area network (WAN) interface to the external network 105. In some example embodiments, all traffic between the terminal device 140 connected in the Wi-Fi mesh network and the external network 105 may be forwarded via the root AP. In addition, if the network 102 is a Wi-Fi mesh network, the handover of the terminal device 140 can also be referred to as a Wi-Fi handover herein.

Although the Wi-Fi mesh network may be taken as an example of the network 102 to describe some example embodiments of the present disclosure in the following, this description is only for example without suggesting any limitation. In some other example embodiments, the network 102 may be a communication network or computer network of any other suitable type, and the first network device 110, the second network device 120 and the third network device 130 may be network devices of any other suitable type accordingly. In some example embodiments, the external network 105 can be a wide area network, which can be further connected to the Internet. In some other example embodiments, the external network 105 may be a communication network or computer network of any other suitable type.

Although the first network device 110, the second network device 120, the third network device 130, the terminal device 140, the fourth network device 150, and the fifth network device 160 are described in the communication environment 100 of FIGS. 1A and 1B, example embodiments of the present disclosure may be equally applicable to any other suitable communication devices in communication with one another. That is, example embodiments of the present disclosure are not limited to the example scenarios of FIGS. 1A and 1B. In this regard, it is noted that although the terminal device 140 is schematically depicted as a mobile phone, and the first network device 110, the second network device 120, the third network device 130, the fourth network device 150, and the fifth network device 160 are schematically depicted as access points in FIGS. 1A and 1B, it is understood that these depictions are only for example without suggesting any limitation. In other example embodiments, the first network device 110, the second network device 120, the third network device 130, the terminal device 140, the fourth network device 150, and the fifth network device 160 may be any other communication devices, for example, any other wireless communication devices.

It is to be understood that the particular number of various communication devices, the particular number of various communication links, and the particular number of other elements as shown in FIGS. 1A and 1B are only for the purpose of illustration without suggesting any limitations. The communication environment 100 may include any suitable number of communication devices, any suitable number of communication links, and any suitable number of other elements adapted for implementing example embodiments of the present disclosure. In addition, it would be appreciated that there may be various wireless communications as well as wireline communications (if needed) among all the communication devices.

Communications in the communication environment 100 may be implemented according to any proper communication protocol(s), comprising but not limited to, cellular communication protocols of the first generation (1G), the second generation (2G), the third generation (3G), the fourth generation (4G) and the fifth generation (5G), NR-U and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
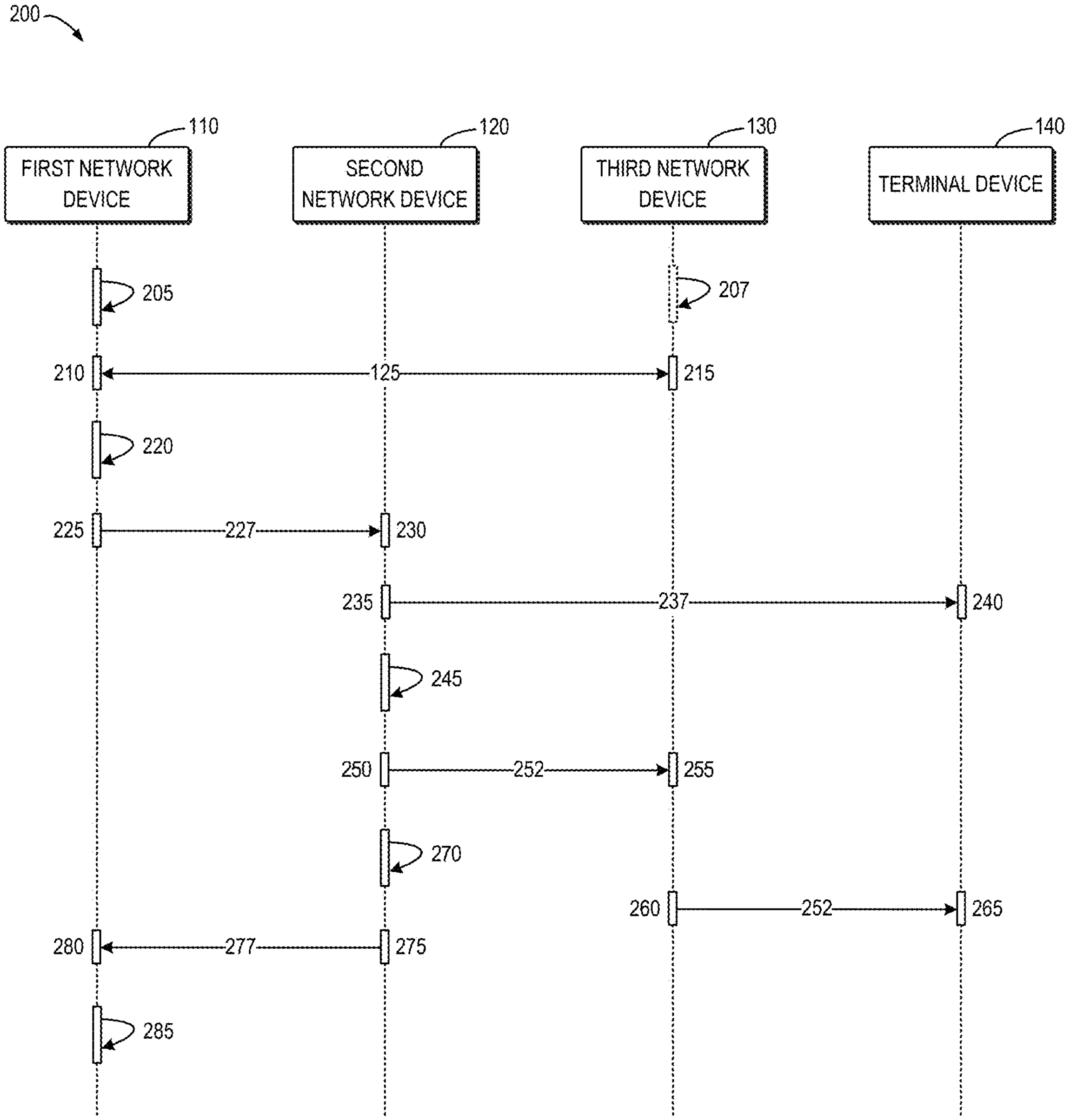
FIG. 2 illustrates an example communication process among a first network device, a second network device, a third network device, and a terminal device in accordance with some example embodiments of the present disclosure.

FIG. 2 illustrates an example communication process 200 among the first network device 110, the second network device 120, the third network device 130, and the terminal device 140 in accordance with some example embodiments of the present disclosure. For the purpose of discussion, the example communication process 200 will be described with reference to FIGS. 1A and 1B. However, it would be appreciated that the example communication process 200 may be equally applicable to other communication scenarios in which a plurality of devices can communicate with one another.

As described above with reference to FIGS. 1A and 1B, the terminal device 140 initially connects to the second network device 120 and the first network device 110 has the first path 115 with the second network device 120 for data transmissions between the terminal device 140 and the external network 105. With the movement of the terminal device 140 along the direction 142, the terminal device 140 moves away from the second network device 120 and towards the third network device 130. Therefore, as shown in FIG. 1B, the terminal device 140 can disconnect from the second network device 120 and may instead connect to the third network device 130.

In this event, as shown in FIG. 2, the first network device 110 may determine (205) that the terminal device 140 is to be handed over from the second network device 120 to the third network device 130. It is to be understood that there are various manners for the first network device 110 to determine (205) the handover of the terminal device 140 from the second network device 120 to the third network device 130. For example, the terminal device 140 can detect that it is moving out of the coverage of the second network device 120 and moving into the coverage of the third network device 130. Then, before disconnecting from the second network device 120, the terminal device 140 may report to the first network device 110 via the first path 115 that it is to be handed over from the second network device 120 to the third network device 130.

In some other example embodiments, the first network device 110 can determine the handover of the terminal device 140 based on a communication with the third network device 130. In particular, during the handover of the terminal device 140 from the second network device 120 to the third network device 130, the third network device 130 can determine (207) that the terminal device 140 associates to the third network device 130. Then, in order to implement the data transmissions between the terminal device 140 and the external network 105, the third network device 130 may transmit a request to the first network device 110 for establishing the second path 125 between the first network device 110 and the third network device 130. Upon receiving the request from the third network device 130, the first network device 110 may determine (205) that the terminal device 140 is to be handed over from the second network device 120 to the third network device 130. In this way, the handover of the terminal device 140 can be determined by the first network device 110 with a higher reliability.

After determining (205) the handover of the terminal device 140 from the second network device 120 to the third network device 130, the first network device 110 may establish (210) the second path 125 between the first network device 110 and the third network device 130, so that the data communications between the terminal device 140 and the external network 105 can be forwarded via the second path 125. From the perspective of the third network device 130, if the third network device 130 determines (207) that the terminal device 140 associates to the third network device 130, then the third network device 130 may establish (215) the second path 125 between the first network device 110 and the third network device 130. More particularly, the first network device 110 and the third network device 130 may need to communicate with each other to establish the second path 125 between them.

In some example embodiments, the establishment of the second path 125 may be initiated by the first network device 110. For example, if the handover of the terminal device 140 is reported by the terminal device 140 or other devices to the first network device 110, the first network device 110 can initiate the establishment of the second path 125. For instance, the first network device 110 can send a request for establishing the second path 125 to the third network device 130. In some other example embodiments, the establishment of the second path 125 may be triggered by the third network device 130. For example, as described above, if the third network device 130 determines (207) the association of the terminal device 140 to the third network device 130, then the third network device 130 can transmit a request for establishing the second path 125 to the first network device 110. It is noted that the request for establishing the second path 125 can be transmitted in any suitable message between the first network device 110 and the third network device 130. In some example embodiments, the request for establishing the second path 125 can be transmitted in a protocol message based on a specially designed control protocol between the network devices in the network 102. Such example embodiments will be further described hereinafter with reference to FIG. 4.

Continuing with reference to FIG. 2, since the terminal device 140 already disconnects from or is about to disconnect from the second network device 120, the first network device 110 may disable (220) data transmission for the terminal device 140 from the first network device 110 to the second network device 120 via the first path 115. As such, the first network device 110 can avoid forwarding data for the terminal device 140 from the external network 105 to the second network device 120, since the second network device 120 may be not connected to the terminal device 140 any longer. The first network device 110 may employ various manners to disable (220) the data transmission for the terminal device 140 via the first path 115. For example, the first network device 110 can mark the first path 115 as disabled for the terminal device 140, and thus can be prevented from transmitting data for the terminal device 140 via the first path 115. In some other example embodiments, the first network device 110 can disable (220) the data transmission for the terminal device 140 via the first path 115 by controlling a state machine for the first path 115. Such example embodiments will be further described hereinafter with reference to FIG. 3.

After disabling (220) the data transmission for the terminal device 140 via the first path 115, the first network device 110 may transmit (225) a handover indication 227 for the terminal device 140 to the second network device 120. Accordingly, the second network device 120 may receive (230) the handover indication 227 from the first network device 110, and the handover indication 227 can inform the second network device 120 that the terminal device 140 is to be handed over from the second network device 120 to the third network device 130. In some example embodiments, when receiving (230) the handover indication 227 from the first network device 110, the second network device 120 may be transmitting (235) buffered data to the terminal device 140, and the terminal device 140 may be receiving (240) the buffered data from the second network device 120. For example, the buffered data of the second network device 120 may be received from the first network device 110 via the first path 115 before the first path 115 is disabled by the first network device 110. After receiving (230) the handover indication 227, the second network device 120 can suspend (245) the transmission of the buffered data at the second network device 120 to the terminal device 140. It is noted that the handover indication 227 can be transmitted in any suitable message from the first network device 110 to the second network device 120. In some example embodiments, the handover indication 227 can be transmitted in a protocol message based on a specially designed control protocol between the network devices in the network 102. Such example embodiments will be further described hereinafter with reference to FIG. 4.

In some other example embodiments, when the second network device 120 receives (230) the handover indication 227, the transmission of the buffered data may already be suspended since the terminal device 140 may be already out of the coverage of the second network device 120 and thus may disconnect from the second network device 120. In either of the above cases, when the second network device 120 receives (230) the handover indication 227 from the first network device 110, a part of the buffered data is already transmitted from the second network device 120 to the terminal device 140. For ease of discussion, this part of the buffered data which is already transmitted to the terminal device 140 may be referred to as transmitted data 237 of the buffered data, and the other part of the buffered data which is not yet transmitted to the terminal device 140 can be referred to as remaining data 252 of the buffered data. In other words, the remaining data 252 fails to be transmitted by the second network device 120 to the terminal device 140 due to the suspension of the transmission of the buffered data. In some example embodiments, the handover indication 227 can not only cause the second network device 120 to suspend (245) the transmission of the buffered data to the terminal device 140, but also can cause the second network device 120 to transmit (250) the remaining data 252 of the buffered data to the third network device 130.

Therefore, upon receiving (230) the handover indication 227, the second network device 120 may transmit (250) the remaining data 252 of the buffered data to the third network device 130, which has the second path 125 with the first network device 110 for forwarding data transmissions between the terminal device 140 and the external network 105. Accordingly, the third network device 130 may receive (255) the remaining data 252 from the second network device 120. It is to be appreciated that the remaining data 252 can be transmitted via any suitable communication links between the second network device 120 and the third network device 130. For example, in order to transmit the remaining data 252 to the third network device 130, the second network device 120 and the third network device 130 can establish a communication path between them in a similar manner for establishing the second path 125 between the first network device 110 and the third network device 130. In other example embodiments, a tunnel can be created between the second network device 120 and the third network device 130 for transmitting the remaining data 252 between them. Such example embodiments will be further detailed hereinafter with reference to FIG. 5.

When the third network device 130 receives (255) the remaining data 252 from the second network device 120, the terminal device 140 has already associated to the third network device 130, namely, the communication link 126 has been established between the third network device 130 and the terminal device 140. Therefore, after receiving (255) the remaining data 252 from the second network device 120, the third network device 130 can transmit (260) the remaining data 252 to the terminal device 140 via the communication link 126. In other words, the terminal device 140 can receive (265) the remaining data 252 from the third network device 130 via the communication link 126.

Continuing with reference to FIG. 2, after the second network device 120 transmits (250) the remaining data 252 to the third network device 130, the second network device 120 may determine (270) that the transmission of the remaining data 252 is complete. That is, the remaining data 252 has been successfully transmitted by the second network device 120 to the third network device 130. Then, the second network device 120 may transmit (275) a completion indication 277 to the first network device 110. Accordingly, the first network device 110 may receive (280) the completion indication 277 from the second network device 120. The completion indication 277 can indicate to the first network device 110 that the transmission of the remaining data 252 from the second network device 120 to the third network device 130 is complete. Thus, upon receiving (280) the completion indication 277, the first network device 110 may enable (285) data transmission for the terminal device 140 from the first network device 110 to the third network device 130 via the second path 125.

In other words, during the handover of the terminal device 140 from the second network device 120 to the third network device 130, the first network device 110 may suspend forwarding data towards the terminal device 140 via the network 102 until the transmission of the remaining data 252 is complete. Then, after the transmission of the remaining data 252 is complete, the first network device 110 may resume the forwarding of data towards the terminal device 140 via the network 102. It is noted that the completion indication 277 can be transmitted in any suitable message from the second network device 120 to the first network device 110. In some example embodiments, the completion indication 277 can be transmitted in a protocol message based on a specially designed control protocol between the network devices in the network 102. Such example embodiments will be further described hereinafter with reference to FIG. 4.

The first network device 110 may employ various manners to enable (285) the data transmission for the terminal device 140 via the second path 125. For example, the first network device 110 can mark the second path 125 as enabled for the terminal device 140, and thus can start transmitting data for the terminal device 140 via the second path 125. In some other example embodiments, the first network device 110 can enable (285) the data transmission for the terminal device 140 via the second path 125 by controlling a state machine for the second path 125. Such example embodiments will be further described hereinafter with reference to FIG. 3.

It is seen that although the second path 125 is already established between the first network device 110 and the third network device 130, the first network device 110 may avoid transmitting data for the terminal device 140 via the second path 125 until receiving (280) the completion indication 277 from the second network device 120. This is because the remaining data 252 may need to be transmitted to the terminal device 140 before new data for the terminal device 140 and may be not yet transmitted to the terminal device 140. For example, after disabling the data transmission for the terminal device 140 via the first path 115 and before enabling the data transmission for the terminal device 140 via the second path 125, if the first network device 110 receives data for the terminal device 140 from an external device in the external network 105 outside the network 102, then the first network device 110 can buffer the data in a buffer of the first network device 110. In this way, the data for the terminal device 140 from the external network 105 during the handover of the terminal device 140 can be buffered by the first network device 110, thereby avoiding loss of the data for the terminal device 140 from the external network 105 during the handover of the terminal device 140.

In some example embodiments, the first network device 110 may not receive (280) the completion indication 277 from the second network device 120 for some reasons. For example, if there is a failure of the second network device 120, the second network device 120 may be unable to transmit the completion indication 277 to the first network device 110. As another example, the completion indication 277 may be unsuccessfully received by the first network device 110 due to a poor quality of the communication signals. To avoid indefinite waiting for the completion indication 277 from the second network device 120 in the above-mentioned situations, the first network device 110 may determine and configure a reasonable size of the buffer based on various factors. In other words, the buffer of the first network device 110 may have a size reasonably determined based on these factors. In some example embodiments, in the absence of the completion indication 277, the first network device 110 can enable (285) the data transmission for the terminal device 140 via the second path 125 after the buffer of the first network device 110 is full. The details of the factors for determining the size of the buffer of the first network device 110 will be further described hereinafter.

After enabling (285) of the data transmission via the second path 125, the first network device 110 can then transmit the data in the buffer to the third network device 130 and to the terminal device 140 via the second path 125. As such, the first network device 110 can ensure that the new data for the terminal device 140 from the external network 105 is transmitted to the third network device 130 after the third network device 130 receives the remaining data 252 from the second network device 120. From the perspective of the third network device 130, the third network device 130 can receive the data in the buffer of the first network device 110 via the second path 125 from the first network device 110. Then, the third network device 130 can transmit the data to the terminal device 140 via the communication link 126.

It should be noted that, in some example embodiments, the second network device 120 can be the same device as the first network device 110. In other words, the terminal device 140 is handed over from the first network device 110 to the third network device 130. In this event, various communications between the first network device 110 and the second network device 120 can be omitted, and other communications and operations may be the same or similar to the example communication process 200. It should be also noted that, in some example embodiments, the third network device 130 can be the same device as the first network device 110. In other words, the terminal device 140 is handed over from the second network device 120 to the first network device 110. In this event, various communications between the first network device 110 and the third network device 130 can be omitted, and other communications and operations may be the same or similar to the example communication process 200.

Through the example communication process 200, during the handover of the terminal device 140 from the second network device 120 to the third network device 130, the first network device 110 can avoid transmitting data for the terminal device 140 to the second network device 120 by disabling the data transmission via the first path 115. Additionally, the remaining data 252 of the buffered data at the second network device 120, which are not transmitted to the terminal device 140 by the second network device 120, can be transmitted from the second network device 120 to the third network device 130, and thus the third network device 130 can then transmit the remaining data 252 to the terminal device 140. As a result, no data for the terminal device 140 may be lost during the handover of the terminal device 140 from the second network device 120 to the third network device 130, thereby improving the user experience of the communication service provided by the communication network 102.

As described above, in some example embodiments, the first network device 110 may use a buffer for buffering the data for the terminal device 140 received from the external network 105 during the handover of the terminal device 140, and the first network device 110 may determine the size of the buffer based on various factors. The details of the factors for determining the size of the buffer of the first network device 110 will now be further described herein. For example, a factor may be the duration for the terminal device 140 to be handed over from the second network device 120 to the third network device 130. It is understood that a longer duration for the handover of the terminal device 140 may require the buffer to be configured with a greater size, so as to buffer more potential data for the terminal device 140 from the external network 105.

Additionally or alternatively, another factor may be a data rate of the transmission of the remaining data 252 from the second network device 120 to the third network device 130. Because the first network device 110 may need to wait for the completion of the transmission of the remaining data 252 to enable the data transmission for the terminal device 140 via the second path 125, a higher data rate of the transmission of the remaining data 252 can allow shorter transmission duration for the remaining data 252, and thus the first network device 110 may configure the buffer with a smaller size. Additionally or alternatively, a further factor may be a capability of the terminal device 140. It is understood that a higher capability of the terminal device 140 can correspond to a greater transmission speed of the data for the terminal device 140 from the external network 105, and thus can lead to a greater size of the buffer of the first network device 110. In addition to the factors as indicated above, the first network device 110 may determine the size of the buffer based on other potential factors, such as, the size of a transmission queue at the second network device 120 for the terminal device 140, or the like.

As mentioned in the description of FIG. 2, in some example embodiments, the remaining data 252 can be transmitted via a tunnel between the second network device 120 and the third network device 130. In such example embodiments, the first network device 110 can dynamically manage the buffer for buffering the data from the external network 105 towards the terminal device 140 according to a typical period of the handover procedure of the terminal device 140, a data rate of the tunnel, and the capability of the terminal device 140. The dynamically managed buffer at the first network device 110 can ensure lower latency of the forwarding of data to the terminal device 140 during the handover procedure for user experience improvement.

More particularly, the first network device 110 may dynamically estimate and manage the size of the buffer for buffering the data for the terminal device 140 based on the equation (1) as follows:

$$nBufferSize = bufferMargin + \left(\frac{phyRateSta}{phyRateTunnelPath * \text{weight}}\right) * (handoverPeriod + queueSizeSta), \quad (1)$$

in which "nBufferSize" represents the dynamically managed size of the buffer in the first network device 110 for the terminal device 140; "BufferMargin" represents a pre-defined buffer margin, it can be fixed to be 50 milliseconds as a base of the buffer size; "HandoverPeriod" is a typical period of a handover procedure of a terminal device, it may be 100 milliseconds with 802.11r disabled and it may be 50 milliseconds with 802.11r enabled; "QueueSizeSta" represents a typical queue size in the second network device 120 for the terminal device 140, it may be 100 milliseconds; "PhyRateSta" represents the physical rate of the terminal device 140 at current association to the second network device 120; "PhyRateTunnelPath" and "weight" are the capacity indication of the tunnel path between the second network device 120 and the third network device 130.

If the backhaul between the second network device 120 and the third network device 130 is a wireless backhaul, then "phyRateTunnelPath" may be the Wi-Fi physical rate and "weight" may be 1. If the backhaul between the second network device 120 and the third network device 130 is a wired backhaul, then "phyRateTunnelPath" may be the wired physical rate and "weight" can be a higher value of 2 to 5. It is to be understood that all the particular values as listed here for the various factors are only for example without suggesting any limitation. In other example embodiments, the various factors can be configured to have any other suitable values according to the specific technical environment and performance requirements.

With this dynamic buffer management algorithm, the buffer size of the buffer at the first network device 110 can be dynamically configured to correspond to the typical range of 50 milliseconds to 250 milliseconds for a handover of the terminal device 140. For example, the higher the performance of the tunnel path between the second network device 120 and the third network device 130 based on the mesh network backbone is, the lower the buffer size of the buffer at the first network device 110 during a handover procedure of a terminal device can be.

In some example embodiments, although the downstream data transmission for the terminal device 140 via the first path 115 and the second path 125 may need to be suspended during the handover of the terminal device 140, the upstream data transmission for the terminal device 140 can be performed without impact by the handover of the terminal device 140. In other words, for the upstream traffic forwarding related to the terminal device 140, there is no specific handling needed to be performed at the network devices. Both the first network device 110 and other network devices can perform normal upstream traffic forwarding as if there is no handover of the terminal device 140. In this way, the upstream data transmission for the terminal device 140 can be performed via the network 102 without interruption, thereby improving the user experience of the communication service provided by the network 102.

In particular, before the terminal device 140 is handed over from the second network device 120 to the third network device 130, meaning that the communication link 124 still exists between the second network device 120 and the terminal device 140, then the second network device 120 may receive data generated by the terminal device 140 from the terminal device 140 via the communication link 124. Afterwards, the second network device 120 may transmit the data to the first network device 110 via the first path 115. From the perspective of the first network device 110, the first network device 110 may receive the data generated by the terminal device 140 from the second network device 120 via the first path 115. Then, the first network device 110 may transmit the data to an external device in the network 105 outside the network 102.

Similarly, after the terminal device 140 is handed over from the second network device 120 to the third network device 130, meaning that the communication link 126 is established between the third network device 130 and the terminal device 140, then the third network device 130 may receive data generated by the terminal device 140 from the terminal device 140 via the communication link 126. Afterwards, the third network device 130 may transmit the data to the first network device 110 via the second path 125. From the perspective of the first network device 110, the first network device 110 may receive the data generated by the terminal device 140 from the third network device 130 via the second path 125. Then, the first network device 110 may transmit the data to an external device in the network 105 outside the network 102.

As described above with reference to FIG. 2, in some example embodiments, the first network device 110 can disable the data transmission for the terminal device 140 via the first path 115 by controlling a state machine for the first path 115, or enable the data transmission for the terminal device 140 via the second path 125 by controlling a state machine for the second path 125. More generally, since all traffic between the terminal device 140 and the external network 105 may be forwarded via the first network device 110, the first network device 110 can maintain information of various paths between the terminal device 140 and the first network device 110, and can record which network device in the network 102 is the current network device connecting with the terminal device 140. Based on the information of the paths for the terminal device 140, the first network device 110 can maintain and manage the state of any of the paths for each terminal device through a state machine of the path. In this way, the management and control of the states of a plurality of paths by the first network device 110 for a terminal device can be more efficient and effective. For example, based on management and control of the states of various paths for the terminal device 140, the first network device 110 can control the data forwarding towards the terminal device 140 via the network 102.

Figure 3:
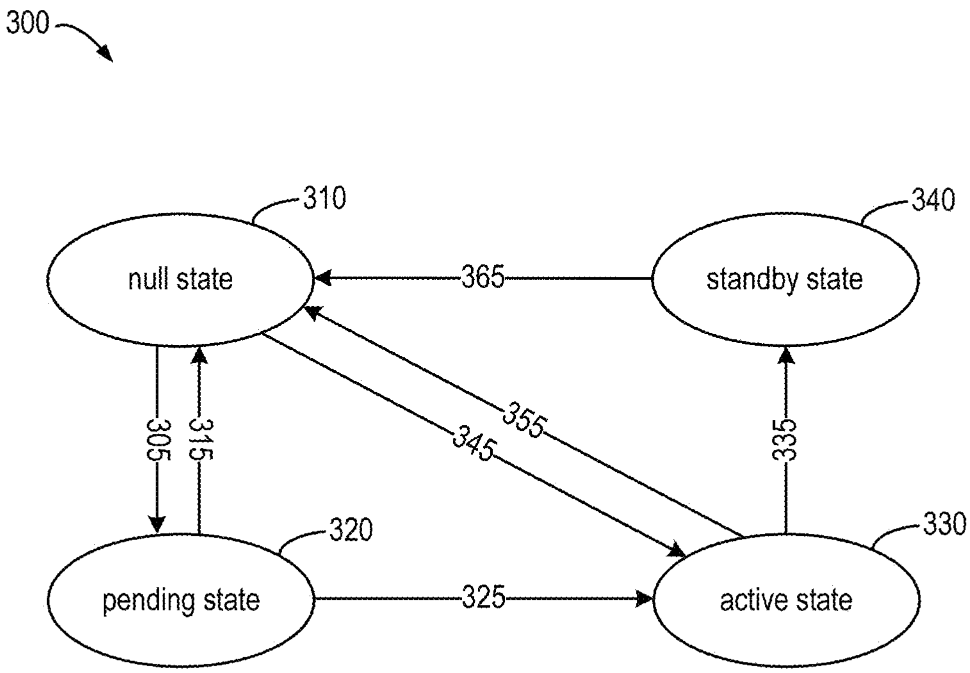
FIG. 3 illustrates an example state machine used by a first network device to control a state of a path for a terminal device in accordance with some example embodiments of the present disclosure.

FIG. 3 illustrates an example state machine 300 used by the first network device 110 to control a state of a path for the terminal device 140 in accordance with some example embodiments of the present disclosure. It is noted that the example state machine 300 can be configured for a path per terminal device level, that is, each path associated with each terminal device can have an example state machine 300. Without loss of generality, it is assumed that the example state machine 300 is configured for a path (such as the first path 115 and the second path 125) associated with the terminal device 140 in the following. The example state machine 300 can be designed to control the traffic forwarding at the first network device 110, and control the switching between different states of the first path 115 or the second path 125 when the terminal device 140 is handed over from the second network device 120 to the third network device 130 in the same network 102. In addition, the example state machine 300 can also control the second network device 120 to forward the remaining data 252 for the terminal device 140 to the third network device 130, and then the third network device 130 can forward the remaining data 252 to the terminal device 140 to avoid buffered data loss.

As shown in FIG. 3, the example state machine 300 may include four states for a path associated with the terminal device 140, namely, a null state 310, a pending state 320, an active state 330, and a standby state 340. In some example embodiments, only if a path is in the active state 330, the first network device 110 can forward downstream data to the terminal device 140 via the path. For example, if the first path 115 is in the active state 330, then the first network device 110 can transmit data for the terminal device 140 from the external network 105 to the terminal device 140 via the first path 115. Similarly, if the second path 125 is in the active state 330, then the first network device 110 can transmit data for the terminal device 140 from the external network 105 to the terminal device 140 via the second path 125.

For an initial connection scenario in which the terminal device 140 initially connects to the network 102, the state of an initial path associated with the terminal device 140 may be switched (345) from the null state 310 to the active state 330 for performing normal data forwarding associate with the terminal device 140 immediately. In other words, when the terminal device 140 which is not previously connected to the network 102 initially connects to a network device in the network 102, the example state machine 300 of the initial path via the network device for the terminal device 140 can be switched (345) from the null state 310 to the active state 330. With reference to FIGS. 1A and 1B, it is assumed that the terminal device 140 initially connects to the second network device 120, rather than being handed over to the second network device 120 from another network device. In this event, if the first network device 110 determines that the terminal device 140 connects to the second network device 120, the first network device 110 can change the state of the first path 115 from the null state 310 to the active state 330.

For a connection created between the terminal device 140 and a target network device during a handover procedure of the terminal device 140, the state of the new path via the target network device for the terminal device 140 can be switched (305) from the null state 310 to the pending state 320. In other words, in the example scenarios of FIGS. 1A and 1B, when the terminal device 140 is handed over from the second network device 120 to the third network device 130, and the third network device 130 sends the request for establishing the second path 125 to the first network device 110, the state of the second path 125 may be switched (305) from the null state 310 to the pending state 320. From the perspective of the first network device 110, upon establishing the second path 125, the first network device 110 can change the state of the second path 125 from the null state 310 to the pending state 320.

In the pending state 320 of the second path 125, the first network device 110 may suspend the downstream data forwarding towards the terminal device 140 and keep all data buffered until the state of the second path 125 is changed to the active state 330. In the active state 330 of the second path 125, the first network device 110 can start to forward the buffered data to the terminal device 140 via the second path 125. For example, during the handover procedure of the terminal device 140, the state of the second path 125 can be switched (325) from the pending state 320 to the active state 330 after the second network device 120 completes the transmission of the remaining data 252 to the third network device 130 or after timeout of a predetermined timer. In other words, when the second network device 120 sends the complete indication 277 to the first network device 110, the state of the second path 125 may be switched (325) from the pending state 320 to the active state 330. Accordingly, in the example embodiments of FIG. 2, in order to enable the data transmission via the second path 125, the first network device 110 can change the state of the second path 125 from the pending state 320 to the active state 330. Alternatively or additionally, in the absence of the complete indication 277, if the first network device 110 determines that the predetermined timer expires, the first network device 110 can change the state of the second path 125 from the pending state 320 to the active state 330.

The predetermined timer configured for the pending state 320 of the second path 125 can be based on the dynamic buffer management mechanism at the first network device 110 as described hereinbefore. More particularly, the predetermined duration of the predetermined timer can be based on the size of the buffer of the first network device 110 for buffering data for the terminal device 140 from the external network 105 during the handover of the terminal device 140. The remaining data 252 at the second network device 120 can be expected to be completely forwarded to the third network device 130 within the predetermined duration of the predetermined timer. The predetermined timer can enhance the stability of the present solution in case of some exceptional events that the specially designed protocol messages between the first network device 110 and the second network device 120 are missing, or the second network device 120 is down during the handover procedure.

On the other hand, when the terminal device 140 is handed over from the second network device 120 to the third network device 130, and the third network device 130 sends the request for establishing the second path 125 to the first network device 110, the state of the first path 115 can be switched (335) from the active state 330 to the standby state 340. Accordingly, in the example embodiments of FIG. 2, in order to disable the data transmission via the first path 115, the first network device 110 can change the state of the first path 115 from the active state 330 to the standby state 340. Moreover, when the second network device 120 sends the complete indication 277 to the first network device 110, the first path 115 can be released and the state of the first path 115 may be switched (365) from the standby state 340 to the null state 310. From the perspective of the first network device 110, upon receiving the completion indication 277 from the second network device 120, the first network device 110 can change the state of the first path 115 from the standby state 340 to the null state 310.

Furthermore, if the terminal device 140 disconnects from the network 102, both the first path 115 and the second path 125 can be released and the state of either of the paths can be changed from other states to the null state 310. In other words, no matter what the current state of the first path 115 or the second path 125 is, the current state can be switched to the null state 310. For example, when the terminal device 140 disconnects from the network 102, the pending state 310 can be switched (315) to the null state 310, the active state 330 can be switched (355) to the null state 310, and the standby state 340 can be switched (365) to the null state 310. From the perspective of the first network device 110 in the example scenarios of FIGS. 1A and 1B, if the first network device 110 determines that the terminal device 140 disconnects from the network 102, the first network device 110 can change the state of the first path 115 from the standby state 340 or the active state 330 to the null state 310. If the first network device 110 determines that the terminal device 140 disconnects from the network 102, the first network device 110 can change the state of the second path 125 from the pending state 320 to the null state 310.

As described above with reference to FIG. 2, in some example embodiments, each of the request for establishing the second path 125, the handover indication 227, and the completion indication 277 can be transmitted in a protocol message based on a specially designed control protocol between the first network device 110, the second network device 120 and the third network device 130. More generally, various requests, responses and indications (also referred to as notifications herein) among the first network device 110, the second network device 120, the third network device 130 and other network devices in the network 102 can be transmitted in the protocol message based on the specially designed control protocol. In this way, the communications between the first network device 110, the second network device 120 and the third network device 130 for the data lossless handover of the terminal device 140 can be performed more specially and efficiently. An example of such a protocol message will be described below with reference to FIG. 4.

Figure 4:
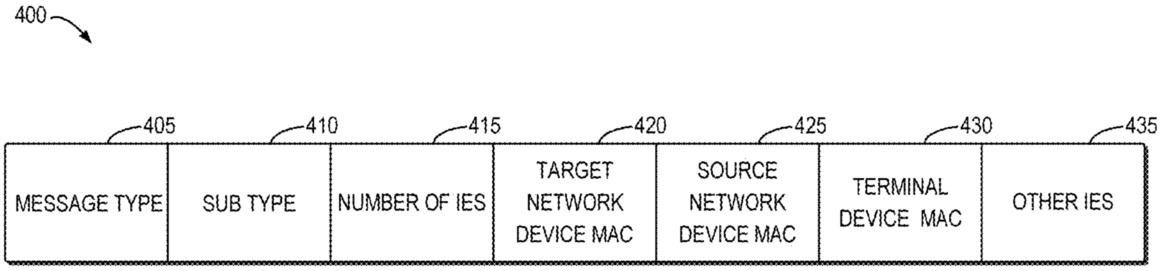
FIG. 4 illustrates an example protocol message according to a specially designed control protocol between network devices in accordance with some example embodiments of the present disclosure.

FIG. 4 illustrates an example protocol message 400 according to the specially designed control protocol between network devices in accordance with some example embodiments of the present disclosure. As used herein, since the specially designed control protocol is designed for communications among the network devices in the network 102, the control protocol may also be referred to as inter network device control protocol. As shown in FIG. 4, the example protocol message 400 may include a first information element (IE) 405, a second IE 410, a third IE 415, a fourth IE 420, a fifth IE 425, a six IE 430, and other IEs 435. It should be understood that the specific order of various IEs as depicted in FIG. 4 is only for example without suggesting any limitation. In other example embodiments, the various IEs in the example protocol message 400 may be in any other suitable order different from the one shown in FIG. 4.

In some example embodiments, the first IE 405 may indicate whether the example protocol message 400 is a request, a response, or an indication. Therefore, as used herein, the first IE 405 can also be referred to as a field of message type. More particularly, the first IE 405 can be set as 1 to indicate that the example protocol message 400 is a request, can be set as 2 to indicate that the example protocol message 400 is a response, and can be set as 3 to indicate that the example protocol message 400 is an indication.

In some example embodiments, the second IE 410 may indicate whether the example protocol message 400 is a request for establishing a path, if the first IE 405 indicates that the example protocol message 400 is a request or a response. Alternatively, the second IE 410 may indicate whether the example protocol message 400 is a handover indication or a completion indication, if the first IE 405 indicates that the example protocol message 400 is an indication. Therefore, as used herein, the second IE 410 can also be referred to as a field of sub type. More particularly, if the first IE 405 indicates that the example protocol message 400 is a request or a response, the second IE 410 can be set as 1 to further indicate that the example protocol message 400 is a request for establishing a new path. On the other hand, if the first IE 405 indicates that the example protocol message 400 is an indication, the second IE 410 can be set as 1 to further indicate that the example protocol message 400 is a handover indication, and can be set as 2 to further indicate that the example protocol message 400 is a complete indication.

In some example embodiments, the third IE 415 may indicate the number of IEs in the example protocol message 400. The fourth IE 420 can indicate a media access control (MAC) address of a target network device in a handover of a terminal device in the network 102. Accordingly, in the example scenarios of FIGS. 1A and 1B, the fourth IE 420 may indicate the MAC address of the third network device 130. The fifth IE 425 can indicate the MAC address of an original network device in a handover of a terminal device in the network 102. Accordingly, in the example scenarios of FIGS. 1A and 1B, the fifth IE 425 may indicate the MAC address of the second network device 120. The sixth IE 430 can indicate the MAC address of a terminal device in a handover of the terminal device in the network 102. Accordingly, in the example scenarios of FIGS. 1A and 1B, the sixth IE 430 may indicate the MAC address of the terminal device 140. The other IEs 435 may indicate other information that may be communicated between the network devices, or can be reserved for other or future purposes.

With these IEs, the example protocol message 400 can be more effective and efficient for the communications between the network devices in the network 102. For example, the first network device 110 can identify a handover event of the terminal device 140 via a protocol message based on the example protocol message 400 between the first network device 110 and other network devices. In addition, based on protocol messages according to the example protocol message 400 between the first network device 110 and other network devices in the network 102, the first network device 110 can maintain the state machine of the first path 115 or the second path 125, and can control the transmission of the remaining data 252.

More specifically, for the example scenarios of FIGS. 1A and 1B, various protocol messages can be designed based on the example protocol message 400 and can be communicated between the network devices during the handover procedure of the terminal device 140. For instance, as an example of the request for establishing the second path 125, a new path establishing request can be created according to the example protocol message 400. This new path establishing request can be sent from the third network device 130 to the first network device 110 when the terminal device 140 associates to the third network device 130. The first IE 405 of the new path establishing request can be configured as 1 to indicate that this message is a request. The second IE 410 of the new path establishing request can be configured as 1 to indicate that this message is a new path establishing request. The third IE 415 of the new path establishing request can be configured according to the number of IEs in the new path establishing request.

The fourth IE 420 of the new path establishing request can be configured to indicate the MAC address of the third network device 130. The fifth IE 425 of the new path establishing request can be configured to indicate the MAC address of the second network device 120. The sixth IE 430 of the new path establishing request can be configured to indicate the MAC address of the terminal device 140. Once the first network device 110 receives this new path establishing request, the first network device 110 can identify the handover of the terminal device 140 happens if another path (for example, the first path 115) is available for the terminal device 140, then the first network device 110 can update the states of the related paths and take actions accordingly.

In addition, as an example of the handover indication 227, a handover notification for the terminal device 140 can be created according to the example protocol message 400. For example, the first IE 405 of the handover notification can be configured as 3 to indicate that this message is a notification. The second IE 410 of the handover notification can be configured as 1 to indicate that this message is a handover notification. The third IE 415 can be configured according to the number of IEs in the handover notification. The fourth IE 420 of the handover notification can be configured to indicate the MAC address of the third network device 130. The fifth IE 425 of the handover notification can be configured to indicate the MAC address of the second network device 120.

The sixth IE 430 of the handover notification can be configured to indicate the MAC address of the terminal device 140. This handover notification can be sent from the first network device 110 to the second network device 120 and the third network device 130 to notify the handover event of the terminal device 140, and trigger the second network device 120 to suspend the transmission of buffered data and buffer the remaining data 252 in the buffer instead of forwarding to the terminal device 140 over the air interface, establish a tunnel between second network device 120 and the third network device 130, and forward the remaining data 252 to the third network device 130 via the tunnel.

Moreover, as an example of the completion indication 277, a buffer forwarding complete notification can be created according to the example protocol message 400. For example, the first IE 405 of the buffer forwarding complete notification can be configured as 3 to indicate that this message is a notification. The second IE 410 of the buffer forwarding complete notification can be configured as 2 to indicate that this message is a buffer forwarding complete notification. The third IE 415 of the buffer forwarding complete notification can be configured according to the number of IEs in the buffer forwarding complete notification. The fourth IE 420 of the buffer forwarding complete notification can be configured to indicate the MAC address of the third network device 130. The fifth IE 425 of the buffer forwarding complete notification can be configured to indicate the MAC address of the second network device 120.

The sixth IE 430 of the buffer forwarding complete notification can be configured to indicate the MAC address of the terminal device 140. This buffer forwarding complete notification can be sent from the second network device 120 to the first network device 110 to notify the transmission of the remaining data 252 towards the third network device 130 is complete. From the perspective of the second network device 120, the condition for the completion of the transmission of the remaining data 252 can be met when the buffer is empty and there is no new data incoming towards the terminal device 140 within a pre-defined margin of period. Once the first network device 110 receives this buffer forwarding complete notification, the first network device 110 can update the states of the related paths and take actions accordingly.

As described above with reference to FIG. 2, in some example embodiments, in order to transmit the remaining data 252 to the third network device 130, the second network device 120 may establish a tunnel between the second network device 120 and the third network device 130. Then, the second network device 120 may transmit the remaining data 252 to the third network device 130 via the tunnel. From the perspective of the third network device 130, in order to receive the remaining data 252, the third network device 130 may establish the tunnel between the second network device 120 and the third network device 130. Then, the third network device 130 may receive the remaining data 252 from the second network device 120 via the tunnel. Using the tunnel between the second network device 120 and the third network device 130, the remaining data 252 can be transmitted from the second network device 120 to the third network device 130 irrespective of the specific network topology of the network 102.

Figure 5:
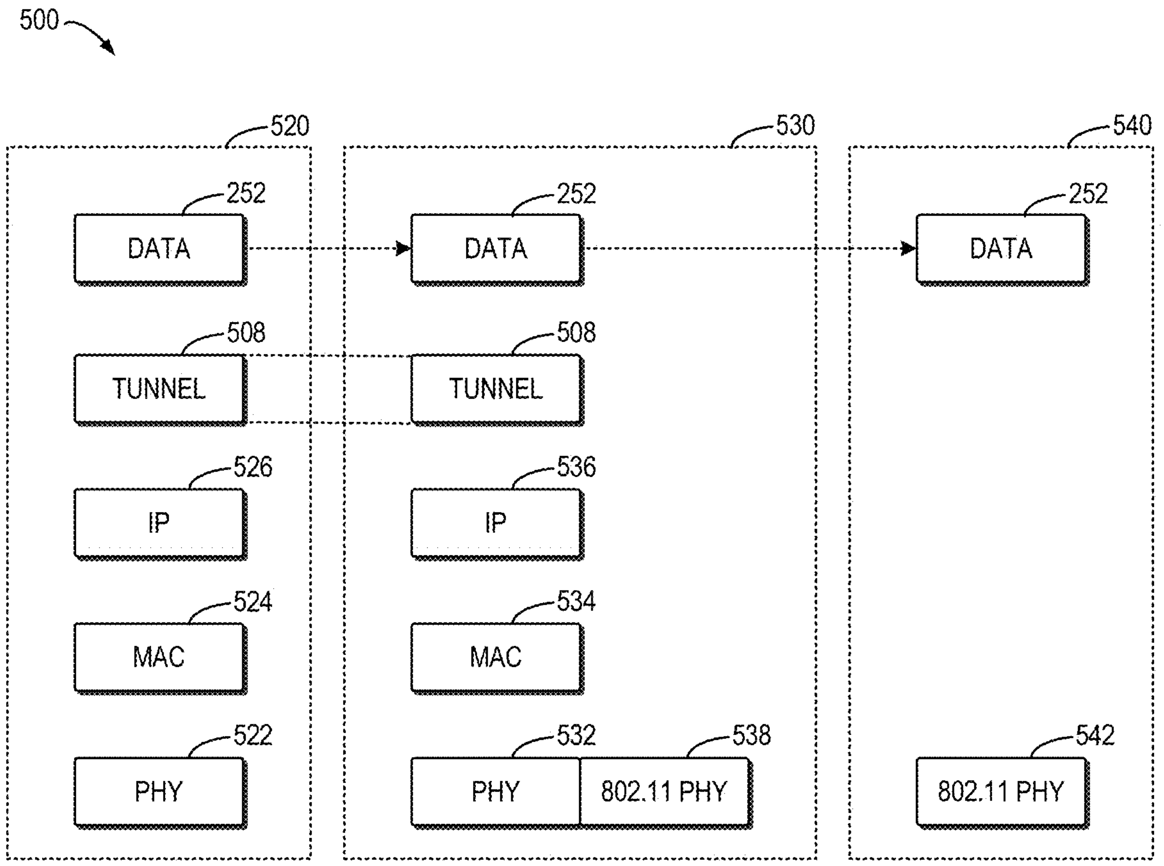
FIG. 5 illustrates an example forwarding protocol stack for a tunnel between a second network device and a third network device in accordance with some example embodiments of the present disclosure.

FIG. 5 illustrates an example forwarding protocol stack 500 for a tunnel 508 between the second network device 120 and the third network device 130 in accordance with some example embodiments of the present disclosure. As shown in FIG. 5, a forwarding protocol stack 520 of the second network device 120 may include a physical layer 522, a MAC layer 524, and an IP layer 526. Correspondingly, a forwarding protocol stack 530 of the third network device 130 may include a physical layer 532, a MAC layer 534, and an IP layer 536. In some example embodiments, the physical layers 522 and 532 may be physical layers of a Wi-Fi mesh network. As shown, the tunnel 508 between the second network device 120 and the third network device 130 can be created above the IP layers 526 and 536. Therefore, the remaining data 252 may be transmitted from the second network device 120 to the third network device 130 via the tunnel 508 irrespective of the specific network topology of the network 102 in the MAC layer and the IP layer. In some example embodiments, the tunnel 508 can be a generic routing encapsulation (GRE) tunnel or a layer 2 tunnel protocol (L2TP) tunnel. In some other example embodiments, the tunnel 508 may be a tunnel of any other suitable type.

In some example embodiments, the content of the remaining data 252 may include the payload of the remaining data 252 and headers for the delivery in the MAC layer. In other words, the remaining data 252 transmitted via the tunnel can be data frames for the MAC layer. Therefore, as shown in FIG. 5, the forwarding protocol stack 530 of the third network device 130 may additionally include an 802.11 physical layer 538 for communicating with an 802.11 physical layer 542 of a forwarding protocol stack 540 of the terminal device 140. Through the communication between the two 802.11 physical layers 538 and 542, the data frames of the remaining data 252 can be transmitted from the third network device 130 to the terminal device 140.

In some example embodiments, the remaining data 252 to be forwarded via the tunnel 508 from the second network device 120 to the third network device 130 can be put into a forwarding queue of a high priority and thus can be forwarded with a high priority over a network interface of the second network device 120, so as to shorten the duration of the transmission of the remaining data 252 and also shorten the duration of the pending state of the second path 125 at the first network device 110, thereby enhancing the user experience during the handover procedure of the terminal device 140. In other words, when transmitting the remaining data 252 to the third network device 130 via the tunnel 508, the second network device 120 may arrange the remaining data 252 into a transmission queue with a priority higher than a threshold priority. In some example embodiments, the threshold priority can be configured according to the specific technical environment and performance requirements.

Figure 6:
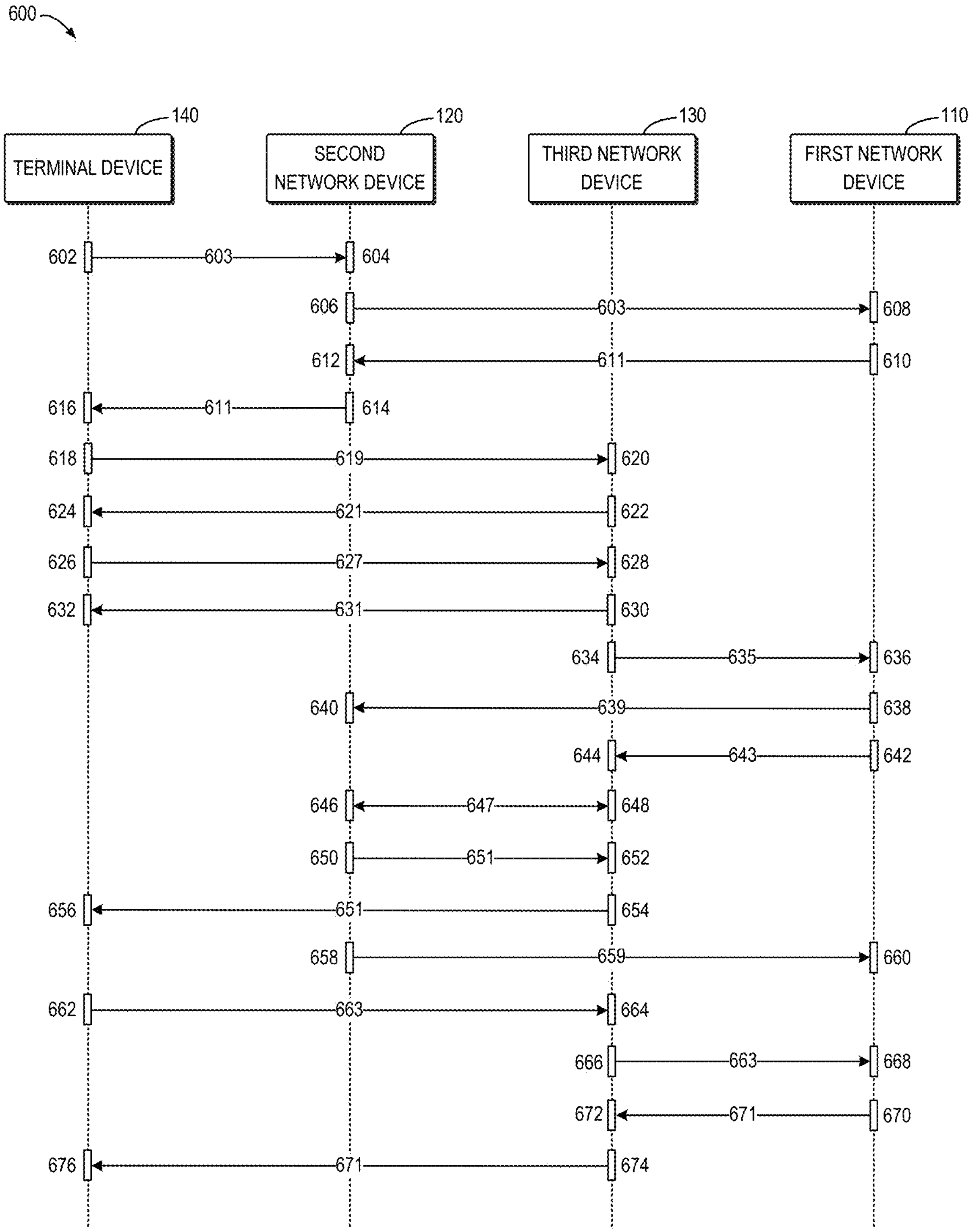
FIG. 6 illustrates another example communication process among a first network device, a second network device, a third network device, and a terminal device in accordance with some example embodiments of the present disclosure.

Hereinbefore, some example embodiments are described with the example communication process 200 as shown in FIG. 2 among the first network device 110, the second network device 120, the third network device 130, and the terminal device 140 in the network 102 of any suitable network type. Hereinafter, some other example embodiments will be described with an example communication process 600 as shown in FIG. 6 among the first network device 110, the second network device 120, the third network device 130, and the terminal device 140 in the network 102 with the type of the Wi-Fi mesh network. In other words, the example communication process 600 can be considered as an example embodiment of the example communication process 200 in a Wi-Fi mesh network.

FIG. 6 illustrates another example communication process 600 among the first network device 110, the second network device 120, the third network device 130, and the terminal device 140 in accordance with some example embodiments of the present disclosure. In particular, FIG. 6 shows a Wi-Fi handover procedure using the data lossless handover solution provided by example embodiments of the present disclosure. For the purpose of discussion, the example communication process 600 will be described with reference to FIGS. 1A and 1B. However, it would be appreciated that the example communication process 600 may be equally applicable to other communication scenarios in which a plurality of devices can communicate with one another.

Since the first network device 110 is the controller of the first path 115 and the second path 125 associated with the terminal device 140, the first network device 110 may maintain the states of the first path 115 and the second path 125 and control the data forwarding towards the terminal device 140 via the first path 115 and the second path 125. As shown in FIG. 1A, it is assumed that the terminal device 140 initially connects to the second network device 120 and the traffic forwarding for the terminal device 140 may be performed via the first path 115 from the first network device 110 to the second network device 120 and to the terminal device 140. In this event, the first path 115 is an active path for the terminal device 140 between the first network device 110 and the second network device 120. At this moment, there is no other path for the terminal device 140, for example, a standby path does not exist for the terminal device 140.

Accordingly, in an upstream data transmission, the terminal device 140 may transmit (602) data 603 to the second network device 120, and thus the second network device 120 can receive (604) the data 603 from the terminal device 140. Then, the second network device 120 may transmit (606) the data 603 to the first network device 110, and thus the first network device 110 can receive (608) the data 603 from the second network device 120. Afterwards, the first network device 110 may transmit the data 603 to an external device in the external network 105.

Similarly, in a downstream data transmission, the first network device 110 may receive data 611 for the terminal device 140 from an external device in the external network 105. Then, the first network device 110 may transmit (610) the data 611 to the second network device 120, and thus the second network device 120 can receive (612) the data 611 from the first network device 110. Next, the second network device 120 may transmit (614) the data 611 to the terminal device 140, and thus the terminal device 140 can receive (616) the data 611 from the second network device 120.

As shown in FIG. 1A, with the movement in the direction 142, the terminal device 140 starts to be handed over from the second network device 120 to the third network device 130 in the same mobility domain. During the handover, the terminal device 140 may connect to the third network device 130. To this end, in a fast BSS transition authentication algorithm (FTAA), the terminal device 140 and the third network device 130 may communicate an authentication request and an authentication response. In particular, the terminal device 140 may transmit (618) an authentication request 619 to the third network device 130, and thus the third network device 130 can receive (620) the authentication request 619 from the terminal device 140. Upon a successful authentication of the terminal device 140, the third network device 130 may transmit (622) an authentication response 621 to the terminal device 140, and thus the terminal device 140 can receive (624) the authentication response 621 from the third network device 130.

Then, the terminal device 140 and the third network device 130 may communicate a re-association request and a re-association response. In particular, the terminal device 140 may transmit (626) a re-association request 627 to the third network device 130, and thus the third network device 130 can receive (628) the re-association request 627 from the terminal device 140. Upon a successful re-association of the terminal device 140, the third network device 130 may transmit (630) a re-association response 631 to the terminal device 140, and thus the terminal device 140 can receive (632) the re-association response 631 from the third network device 130.

During the handover of the terminal device 140, the first network device 110 can identify the handover event of the terminal device 140 via the inter network device control protocol as described above. In particular, the third network device 130 may transmit (634) a path establishing request 635 to the first network device 110, and thus the first network device 110 can receive (636) the path establishing request 635 from the third network device 130. In some example embodiments, the path establishing request 635 can be based on the example protocol message 400 as shown in FIG. 4 and thus can indicate the MAC addresses of the terminal device 140 and the second network device 120. Upon the establishment of the second path 125, the state of the second path 125 can be set as the pending state, and now there is a pending path for the terminal device 140 between the third network device 130 and the first network device 110. When the second path 125 is in the pending state, the downstream data towards the terminal device 140 may be buffered in a buffer (for example, in a transmission queue) in the first network device 110. In the meanwhile, the state of the first path 115 can be set as the standby state, and thus there is a standby path for the terminal device 140 between the second network device 120 and the first network device 110. When the first path 115 is in the standby state, the second network device 120 may suspend forwarding buffered data at the second network device 120 towards the terminal device 140 during the handover period. In addition, the upstream data forwarding from the terminal device 140 to the external network 105 can be performed without interruption.

The first network device 110 may transmit (638) a first handover notification 639 to the second network device 120, and thus the second network device 120 can receive (640) the first handover notification 639 from the first network device 110. In some example embodiments, the first handover notification 639 can be based on the example protocol message 400 as shown in FIG. 4 and thus can indicate the MAC addresses of the terminal device 140 and the third network device 130. Additionally or alternatively, the first network device 110 may transmit (642) a second handover notification 643 to the third network device 130, and thus the third network device 130 can receive (644) the second handover notification 643 from the first network device 110. In some example embodiments, the second handover notification 643 can be based on the example protocol message 400 as shown in FIG. 4 and thus can indicate the MAC addresses of the terminal device 140 and the second network device 120. Through the first handover notification 639 and the second handover notification 643, the first network device 110 can notify the second network device 120 to forward the buffered data failed to send to the terminal device 140 to the third network device 130 via a tunnel with a forwarding queue of a high priority, and then the third network device 130 may forward all these data to the terminal device 140 to avoid buffered data loss.

To this end, the second network device 120 may establish (646) a tunnel 647 together with the third network device 130. From another perspective, the third network device 130 may establish (648) the tunnel 647 together with the second network device 120. Afterwards, the second network device 120 may transmit (650) remaining data 651 of the buffered date to the third network device 130 via the tunnel 647, and thus the third network device 130 can receive (652) the remaining data 651 from the second network device 120 via the tunnel 647. Then, the third network device 130 may transmit (654) the remaining data 651 to the terminal device 140, and thus the terminal device 140 can receive (656) the remaining data 651 from the third network device 130.

The second network device 120 may transmit (658) a complete notification 659 to the first network device 110, and thus the first network device 110 can receive (660) the complete notification 659 from the second network device 120. In some example embodiments, the complete notification 659 can be based on the example protocol message 400 as shown in FIG. 4 and thus can indicate the MAC addresses of the terminal device 140 and the third network device 130. Upon receiving (660) the complete notification 659, the first network device 110 can enable data transmission for the terminal device 140 via the second path 125. In other words, the first network device 110 may suspend the data forwarding towards the terminal device 140 until the transmission of the remaining data 651 by the second network device 120 is complete, and then first network device 110 can resume the data forwarding towards the terminal device 140.

In some example embodiments, the first network device 110 can enable the dynamic control of the size of the buffer for buffering data for the terminal device 140 during the handover period. For example, the size of the buffer can be dynamically managed to correspond to handover duration between 50 milliseconds to 250 milliseconds. After the enabling of the second path 125, the second path 125 is the active path for the terminal device 140 between the third network device 130 and the first network device 110. The first path 115 as the standby path for the terminal device 140 can be released. Therefore, the downstream data forwarding towards the terminal device 140 may be resumed via the second path 125. That is, the terminal device 140 now connects to the third network device 130, and the traffic forwarding may be performed via the second path 125 from the first network device 110 to the third network device 130 and to the terminal device 140.

For example, in an upstream data transmission, the terminal device 140 may transmit (662) data 663 to the third network device 130, and thus the third network device 130 can receive (664) the data 663 from the terminal device 140. Then, the third network device 130 may transmit (666) the data 663 to the first network device 110, and thus the first network device 110 can receive (668) the data 663 from the third network device 130. Afterwards, the first network device 110 may transmit the data 663 to an external device in the external network 105.

Similarly, in a downstream data transmission, the first network device 110 may receive data 671 from an external device in the external network 105. Then, the first network device 110 may transmit (670) the data 671 to the third network device 130, and thus the third network device 130 can receive (672) the data 671 from the first network device 110. Next, the third network device 130 may transmit (674) the data 671 to the terminal device 140, and thus the terminal device 140 can receive (676) the data 671 from the third network device 130.

It should be noted that, in some example embodiments, the second network device 120 can be the same device as the first network device 110. In other words, the terminal device 140 is handed over from the first network device 110 to the third network device 130. In this event, various communications between the first network device 110 and the second network device 120 can be omitted, and other communications and operations may be the same or similar to the example communication process 600. It should be also noted that, in some example embodiments, the third network device 130 can be the same device as the first network device 110. In other words, the terminal device 140 is handed over from the second network device 120 to the first network device 110. In this event, various communications between the first network device 110 and the third network device 130 can be omitted, and other communications and operations may be the same or similar to the example communication process 600.

It can be seen that example embodiments of the present disclosure provide a solution for addressing the data loss problems in the traditional handover procedure of a terminal device between network devices. The solution can implement a data lossless handover procedure, and in particular, the well managed lower latency for the Wi-Fi handover procedure in a Wi-Fi mesh network. With this solution, the widely deployed Wi-Fi mesh networks can deliver good Wi-Fi coverage in houses and in public areas, and also provide continuously excellent user experience even during the Wi-Fi handover period for various end user services, including data services, voice services and video streaming services. Additionally, this solution is a generic solution and is independent to the mesh network topology, it may be created for self-organized Wi-Fi mesh network and fully managed in the distributed Wi-Fi network devices in a mesh network, and it may be a non-centralized solution without additional cost and complexity for a Wi-Fi mesh network deployment.

Figure 7:
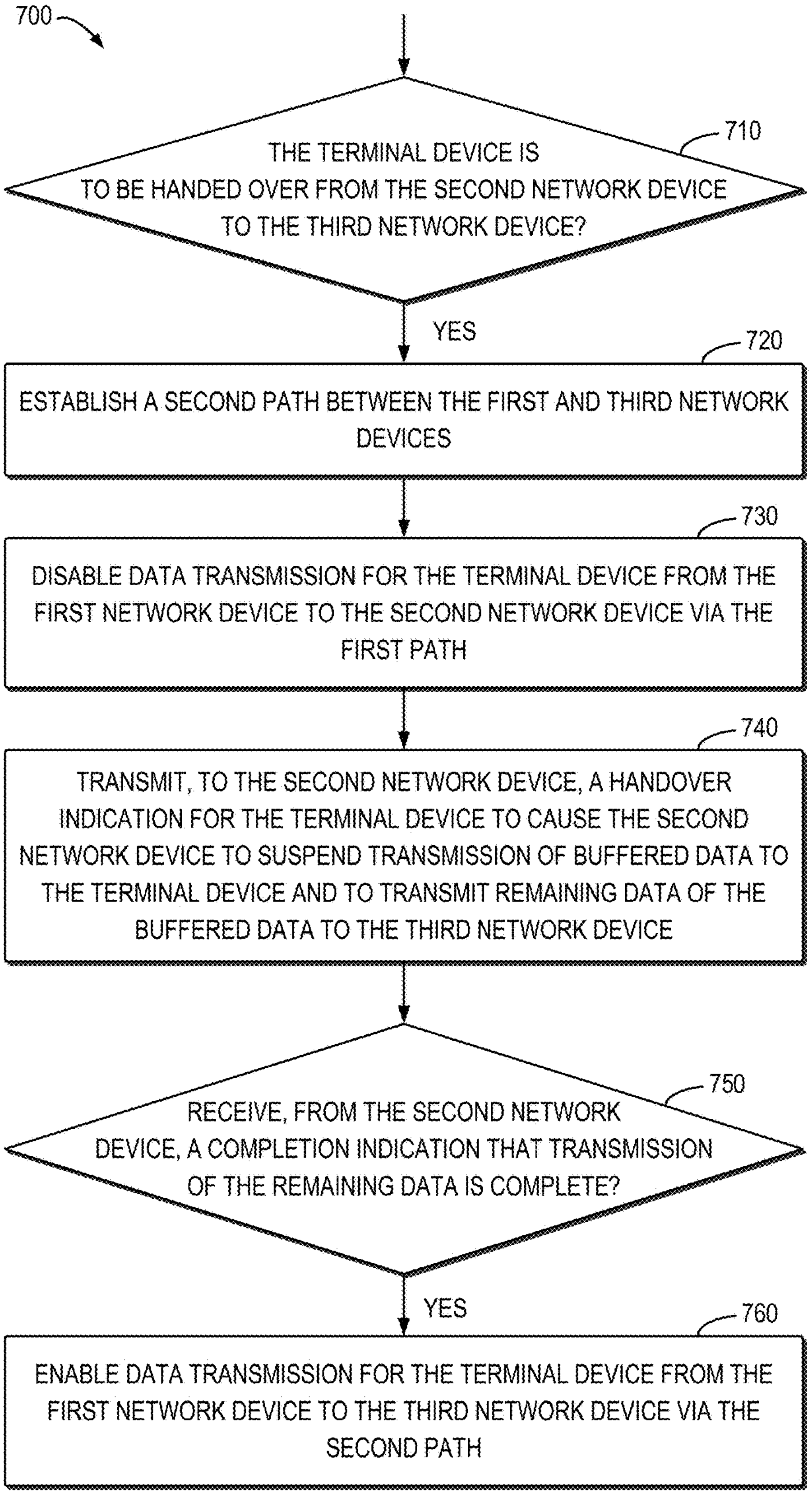
FIG. 7 illustrates a flowchart of an example method for communication in accordance with some example embodiments of the present disclosure.

FIG. 7 illustrates a flowchart of an example method 700 for communication in accordance with some example embodiments of the present disclosure. In some example embodiments, the example method 700 can be implemented at a device in a communication network, such as the first network device 110 as shown in FIG. 1. Additionally or alternatively, the example method 700 can also be implemented at other devices shown in FIG. 1. In some other example embodiments, the example method 700 may be implemented at devices not shown in FIG. 1.

At block 710, the first network device 110 having the first path 115 with the second network device 120 can determine whether the terminal device 140 is to be handed over from the second network device 120 to the third network device 130. At block 720, if the terminal device 140 is to be handed over from the second network device 120 to the third network device 130, the first network device 110 can establish the second path 125 between the first network device 110 and the third network device 130. At block 730, the first network device 110 may disable data transmission for the terminal device 140 from the first network device 110 to the second network device 120 via the first path 115.

At block 740, the first network device 110 may transmit, to the second network device 120, a handover indication for the terminal device 140 to cause the second network device 120 to suspend transmission of buffered data to the terminal device 140 and to transmit remaining data of the buffered data to the third network device 130. At block 750, the first network device 110 may determine whether a completion indication that transmission of the remaining data is complete is received from the second network device 120. At block 760, if the first network device 110 receives the completion indication from the second network device 120, the first network device 110 can enable data transmission for the terminal device 140 from the first network device 110 to the third network device 130 via the second path 125.

In some example embodiments, the example method 700 further comprises: in accordance with reception, from an external device, data to be transmitted to the terminal device 140 after disabling the data transmission via the first path 115 and prior to enabling the data transmission via the second path 125, buffering the data in a buffer of the first network device 110, the external device being outside a network including the first, second and third network devices 110, 120, 130.

In some example embodiments, the example method 700 further comprises: in accordance with the enabling of the data transmission via the second path 125, transmitting the data in the buffer to the third network device 130 via the second path 125.

In some example embodiments, a size of the buffer is determined based on at least one of the following: duration for the terminal device 140 to be handed over from the second network device 120 to the third network device 130, a data rate of the transmission of the remaining data, or a capability of the terminal device 140.

In some example embodiments, disabling the data transmission via the first path 115 comprises: changing a state of the first path 115 from an active state to a standby state.

In some example embodiments, the example method 700 further comprises at least one of the following: in accordance with a determination that the terminal device 140 connects to the second network device 120, changing the state of the first path 115 from a null state to the active state; in accordance with reception of the completion indication, changing the state of the first path 115 from the standby state to the null state; or in accordance with a determination that the terminal device 140 disconnects from a network including the first, second and third network devices 110, 120, 130, changing the state of the first path 115 from the standby state or the active state to the null state.

In some example embodiments, enabling the data transmission via the second path 125 comprises: changing a state of the second path 125 from a pending state to an active state.

In some example embodiments, the example method 700 further comprises at least one of the following: in accordance with the establishing of the second path 125, changing the state of the second path 125 from a null state to the pending state; in accordance with a determination that a predetermined timer expires, changing the state of the second path 125 from the pending state to the active state; or in accordance with a determination that the terminal device 140 disconnects from a network including the first, second and third network devices 110, 120, 130, changing the state of the second path 125 from the pending state to the null state.

In some example embodiments, the example method 700 further comprises: prior to the terminal device 140 is handed over from the second network device 120 to the third network device 130, receiving data generated by the terminal device 140 from the second network device 120 via the first path 115; and transmitting the data generated by the terminal device 140 to an external device outside a network including the first, second and third network devices 110, 120, 130.

In some example embodiments, the example method 700 further comprises: after the terminal device 140 is handed over from the second network device 120 to the third network device 130, receiving data generated by the terminal device 140 from the third network device 130 via the second path 125; and transmitting the data generated by the terminal device 140 to an external device outside a network including the first, second and third network devices 110, 120, 130.

In some example embodiments, the example method 700 further comprises: in accordance with reception, from the third network device 130, a request for establishing the second path 125, determining that the terminal device 140 is to be handed over from the second network device 120 to the third network device 130.

In some example embodiments, each of the request, the handover indication, and the completion indication is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

Figure 8:
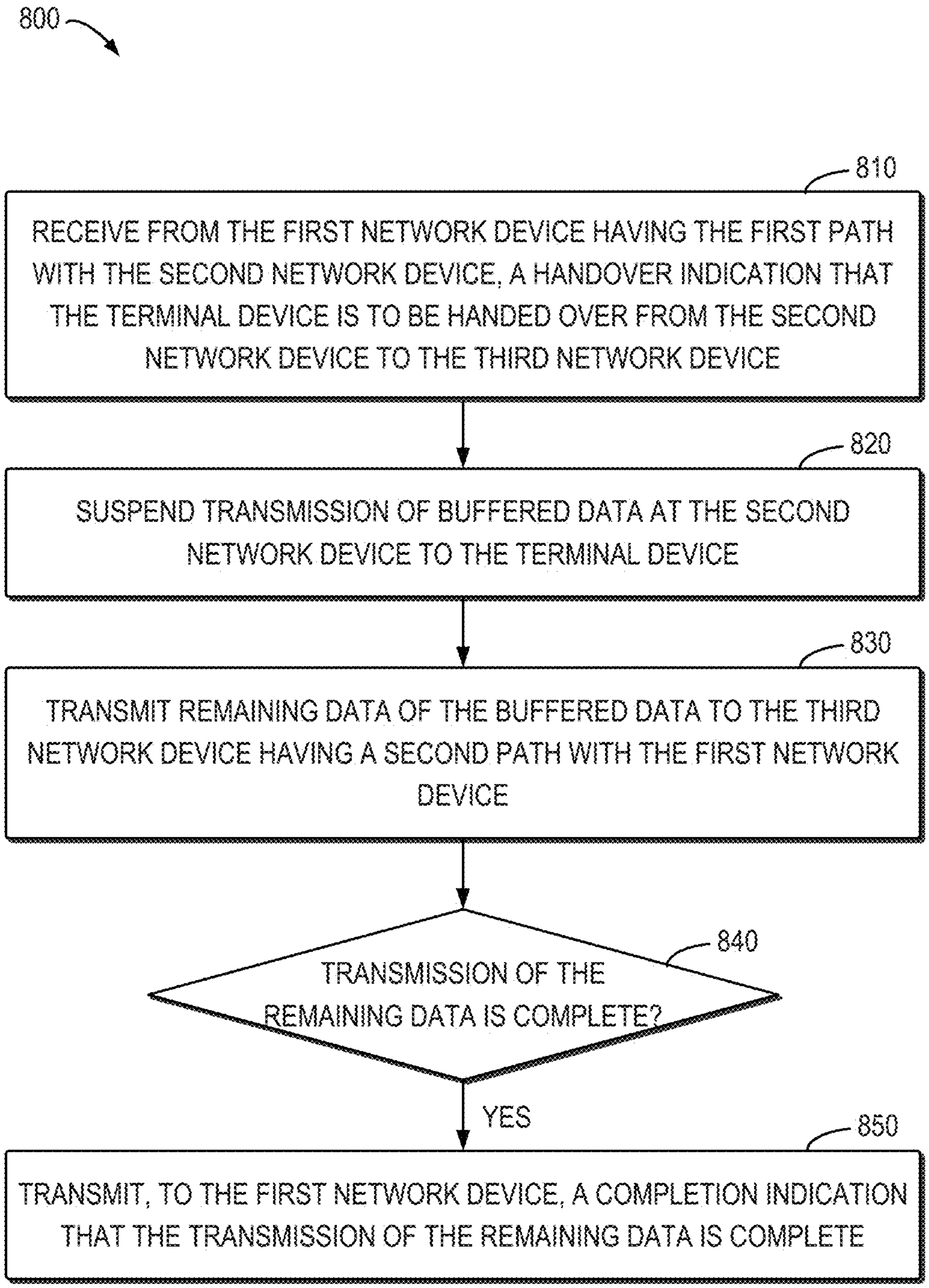
FIG. 8 illustrates a flowchart of another example method for communication in accordance with some example embodiments of the present disclosure.

FIG. 8 illustrates a flowchart of another example method 800 for communication in accordance with some example embodiments of the present disclosure. In some example embodiments, the example method 800 can be implemented at a device in a communication network, such as the second network device 120 as shown in FIG. 1. Additionally or alternatively, the example method 800 can also be implemented at other devices shown in FIG. 1. In some other example embodiments, the example method 800 may be implemented at devices not shown in FIG. 1.

At block 810, the second network device 120 may receive from the first network device 110 having the first path 115 with the second network device 120, a handover indication that the terminal device 140 is to be handed over from the second network device 120 to the third network device 130. At block 820, the second network device 120 can suspend transmission of buffered data at the second network device 120 to the terminal device 140. At block 830, the second network device 120 may transmit remaining data of the buffered data to the third network device 130 having the second path 125 with the first network device 110. At block 840, the second network device 120 may determine whether transmission of the remaining data is complete. At block 850, if the transmission of the remaining data is complete, the second network device 120 can transmit, to the first network device 110, a completion indication that the transmission of the remaining data is complete.

In some example embodiments, transmitting the remaining data comprises: establishing a tunnel between the second and third network devices 120, 130; and transmitting the remaining data to the third network device 130 via the tunnel.

In some example embodiments, transmitting the remaining data to the third network device 130 via the tunnel comprises: arranging the remaining data into a transmission queue with a priority higher than a threshold priority.

In some example embodiments, the example method 800 further comprises: prior to the terminal device 140 is handed over from the second network device 120 to the third network device 130, receiving, from the terminal device 140, data generated by the terminal device 140; and transmitting the data generated by the terminal device 140 to the first network device 110 via the first path 115.

In some example embodiments, each of the handover indication and the completion indication is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

Figure 9:
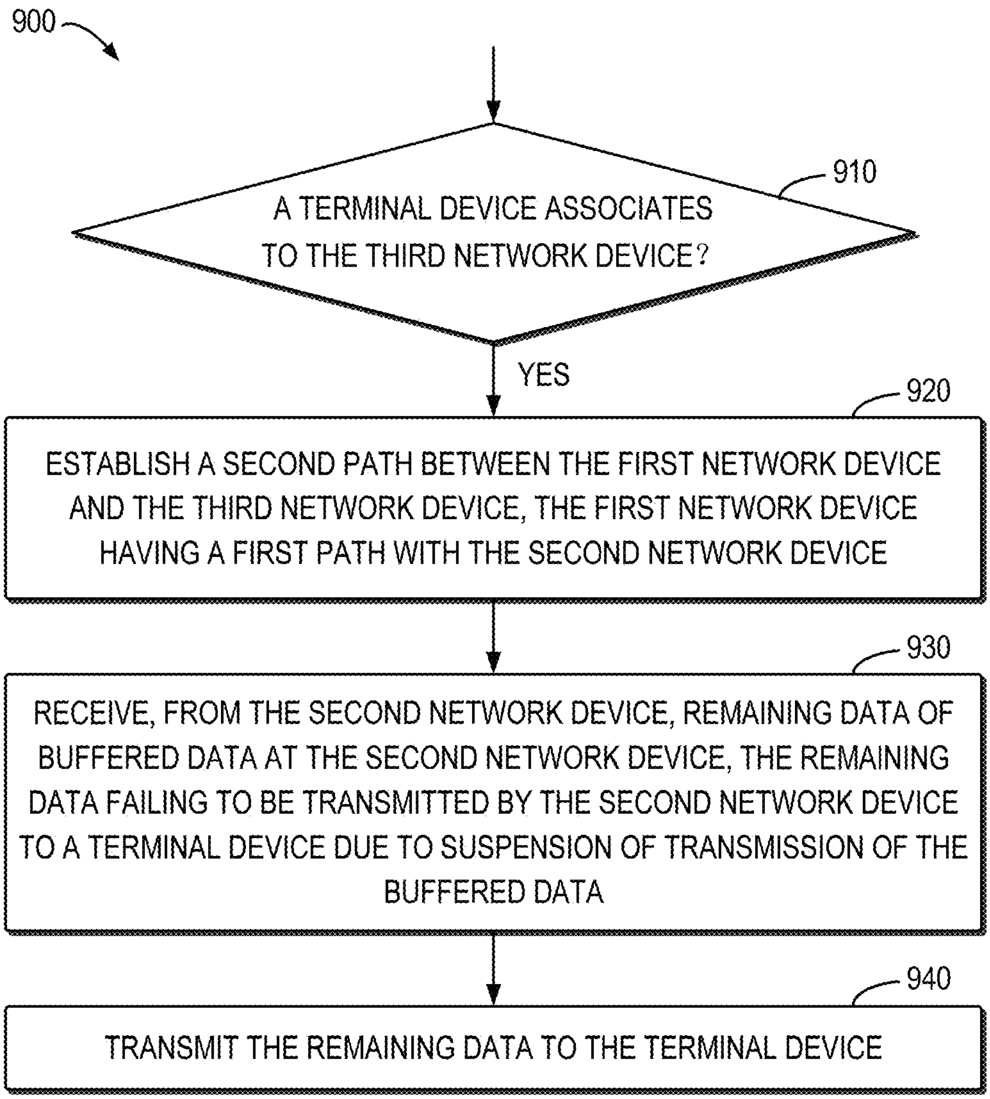
FIG. 9 illustrates a flowchart of a further example method for communication in accordance with some example embodiments of the present disclosure.

FIG. 9 illustrates a flowchart of a further example method 900 for communication in accordance with some example embodiments of the present disclosure. In some example embodiments, the example method 900 can be implemented at a device in a communication network, such as the third network device 130 as shown in FIG. 1. Additionally or alternatively, the example method 900 can also be implemented at other devices shown in FIG. 1. In some other example embodiments, the example method 900 may be implemented at devices not shown in FIG. 1.

At block 910, the third network device 130 may determine whether the terminal device 140 associates to the third network device 130. At block 920, if the terminal device 140 associates to the third network device 130, the third network device 130 may establish the second path 125 between the first network device 110 and the third network device 130, in which the first network device 110 has the first path 115 with the second network device 120. At block 930, the third network device 130 may receive, from the second network device 120, remaining data of buffered data at the second network device 120, in which the remaining data fails to be transmitted by the second network device 120 to the terminal device 140 due to suspension of transmission of the buffered data. At block 940, the third network device 130 can transmit the remaining data to the terminal device 140.

In some example embodiments, receiving the remaining data comprises: establishing a tunnel between the second and third network devices 120, 130; and receiving the remaining data from the second network device 120 via the tunnel.

In some example embodiments, the example method 900 further comprises: after the data transmission via the second path 125 is enabled, receiving, from the first network device 110, data in a buffer of the first network device 110 via the second path 125; and transmitting, to the terminal device 140, the data in the buffer of the first network device 110.

In some example embodiments, the example method 900 further comprises: after the terminal device 140 is handed over from the second network device 120 to the third network device 130, receiving, from the terminal device 140, data generated by the terminal device 140; and transmitting the data generated by the terminal device 140 to the first network device 110 via the second path 125.

In some example embodiments, establishing the second path 125 comprises: transmitting, to the first network device 110, a request for establishing the second path 125.

In some example embodiments, the request is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

In some example embodiments, an apparatus capable of performing the example method 700 (for example, the first network device 110) may comprise means for performing the respective steps of the example method 700. The means may be implemented in any suitable form. For example, the means may be implemented in a circuitry or software module.

In some example embodiments, the apparatus comprises means for, in accordance with a determination, by the first network device 110 having the first path 115 with the second network device 120, that the terminal device 140 is to be handed over from the second network device 120 to the third network device 130, establishing the second path 125 between the first and third network devices 110, 130; means for disabling data transmission for the terminal device 140 from the first network device 110 to the second network device 120 via the first path 115; means for transmitting, to the second network device 120, a handover indication for the terminal device 140 to cause the second network device 120 to suspend transmission of buffered data to the terminal device 140 and to transmit remaining data of the buffered data to the third network device 130; and means for in accordance with reception, from the second network device 120, a completion indication that transmission of the remaining data is complete, enabling data transmission for the terminal device 140 from the first network device 110 to the third network device 130 via the second path 125.

In some example embodiments, the apparatus further comprises: means for, in accordance with reception, from an external device, data to be transmitted to the terminal device 140 after disabling the data transmission via the first path 115 and prior to enabling the data transmission via the second path 125, buffering the data in a buffer of the first network device 110, the external device being outside a network including the first, second and third network devices 110, 120, 130.

In some example embodiments, the apparatus further comprises: means for, in accordance with the enabling of the data transmission via the second path 125, transmitting the data in the buffer to the third network device 130 via the second path 125.

In some example embodiments, a size of the buffer is determined based on at least one of the following: duration for the terminal device 140 to be handed over from the second network device 120 to the third network device 130, a data rate of the transmission of the remaining data, or a capability of the terminal device 140.

In some example embodiments, the means for disabling the data transmission via the first path 115 comprises: means for changing a state of the first path 115 from an active state to a standby state.

In some example embodiments, the apparatus further comprises at least one of the following: means for, in accordance with a determination that the terminal device 140 connects to the second network device 120, changing the state of the first path 115 from a null state to the active state; means for, in accordance with reception of the completion indication, changing the state of the first path 115 from the standby state to the null state; or means for, in accordance with a determination that the terminal device 140 disconnects from a network including the first, second and third network devices 110, 120, 130, changing the state of the first path 115 from the standby state or the active state to the null state.

In some example embodiments, the means for enabling the data transmission via the second path 125 comprises: means for changing a state of the second path 125 from a pending state to an active state.

In some example embodiments, the apparatus further comprises at least one of the following: means for, in accordance with the establishing of the second path 125, changing the state of the second path 125 from a null state to the pending state; means for, in accordance with a determination that a predetermined timer expires, changing the state of the second path 125 from the pending state to the active state; or means for, in accordance with a determination that the terminal device 140 disconnects from a network including the first, second and third network devices 110, 120, 130, changing the state of the second path 125 from the pending state to the null state.

In some example embodiments, the apparatus further comprises: means for, prior to the terminal device 140 is handed over from the second network device 120 to the third network device 130, receiving data generated by the terminal device 140 from the second network device 120 via the first path 115; and means for transmitting the data generated by the terminal device 140 to an external device outside a network including the first, second and third network devices 110, 120, 130.

In some example embodiments, the apparatus further comprises: means for, after the terminal device 140 is handed over from the second network device 120 to the third network device 130, receiving data generated by the terminal device 140 from the third network device 130 via the second path 125; and means for transmitting the data generated by the terminal device 140 to an external device outside a network including the first, second and third network devices 110, 120, 130.

In some example embodiments, the apparatus further comprises: means for, in accordance with reception, from the third network device 130, a request for establishing the second path 125, determining that the terminal device 140 is to be handed over from the second network device 120 to the third network device 130.

In some example embodiments, each of the request, the handover indication, and the completion indication is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

In some example embodiments, the apparatus further comprises means for performing other steps in some example embodiments of the example method 700. In some example embodiments, the means comprises at least one processor and at least one memory including computer program code, the at least one memory and computer program code configured to, with the at least one processor, cause the performance of the example method 700.

In some example embodiments, an apparatus capable of performing the example method 800 (for example, the second network device 120) may comprise means for performing the respective steps of the example method 800. The means may be implemented in any suitable form. For example, the means may be implemented in a circuitry or software module.

In some example embodiments, the apparatus comprises means for receiving, by the second network device 120, from the first network device 110 having the first path 115 with the second network device 120, a handover indication that the terminal device 140 is to be handed over from the second network device 120 to the third network device 130; means for suspending transmission of buffered data at the second network device 120 to the terminal device 140; means for transmitting remaining data of the buffered data to the third network device 130 having the second path 125 with the first network device 110; and means for, in accordance with a determination that transmission of the remaining data is complete, transmitting, to the first network device 110, a completion indication that the transmission of the remaining data is complete.

In some example embodiments, the means for transmitting the remaining data comprises: means for establishing a tunnel between the second and third network devices 120, 130; and means for transmitting the remaining data to the third network device 130 via the tunnel.

In some example embodiments, the means for transmitting the remaining data to the third network device 130 via the tunnel comprises: means for arranging the remaining data into a transmission queue with a priority higher than a threshold priority.

In some example embodiments, the apparatus further comprises: means for, prior to the terminal device 140 is handed over from the second network device 120 to the third network device 130, receiving, from the terminal device 140, data generated by the terminal device 140; and means for transmitting the data generated by the terminal device 140 to the first network device 110 via the first path 115.

In some example embodiments, each of the handover indication and the completion indication is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

In some example embodiments, the apparatus further comprises means for performing other steps in some example embodiments of the example method 800. In some example embodiments, the means comprises at least one processor and at least one memory including computer program code, the at least one memory and computer program code configured to, with the at least one processor, cause the performance of the example method 800.

In some example embodiments, an apparatus capable of performing the example method 900 (for example, the third network device 130) may comprise means for performing the respective steps of the example method 900. The means may be implemented in any suitable form. For example, the means may be implemented in a circuitry or software module.

In some example embodiments, the apparatus comprises means for, in accordance with a determination, by the third network device 130, that the terminal device 140 associates to the third network device 130, establishing the second path 125 between the first network device 110 and the third network device 130, the first network device 110 having the first path 115 with the second network device 120; means for receiving, from the second network device 120, remaining data of buffered data at the second network device 120, the remaining data failing to be transmitted by the second network device 120 to the terminal device 140 due to suspension of transmission of the buffered data; and means for transmitting the remaining data to the terminal device 140.

In some example embodiments, the means for receiving the remaining data comprises: means for establishing a tunnel between the second and third network devices 120, 130; and means for receiving the remaining data from the second network device 120 via the tunnel.

In some example embodiments, the apparatus further comprises: means for, after the data transmission via the second path 125 is enabled, receiving, from the first network device 110, data in a buffer of the first network device 110 via the second path 125; and means for transmitting, to the terminal device 140, the data in the buffer of the first network device 110.

In some example embodiments, the apparatus further comprises: means for, after the terminal device 140 is handed over from the second network device 120 to the third network device 130, receiving, from the terminal device 140, data generated by the terminal device 140; and means for transmitting the data generated by the terminal device 140 to the first network device 110 via the second path 125.

In some example embodiments, the means for establishing the second path 125 comprises: means for transmitting, to the first network device 110, a request for establishing the second path 125.

In some example embodiments, the request is transmitted in a protocol message based on a specially designed control protocol between the first, second and third network devices 110, 120, 130.

In some example embodiments, the protocol message comprises at least one of the following: a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device 120, a fifth information element indicating a media access control address of the third network device 130, or a sixth information element indicating a media access control address of the terminal device 140.

In some example embodiments, the first network device 110 comprises a root access point in a Wi-Fi mesh network, and each of the second and third network devices 120, 130 comprises a non-root access point in the Wi-Fi mesh network.

In some example embodiments, the apparatus further comprises means for performing other steps in some example embodiments of the example method 900. In some example embodiments, the means comprises at least one processor and at least one memory including computer program code, the at least one memory and computer program code configured to, with the at least one processor, cause the performance of the example method 900.

Figure 10:
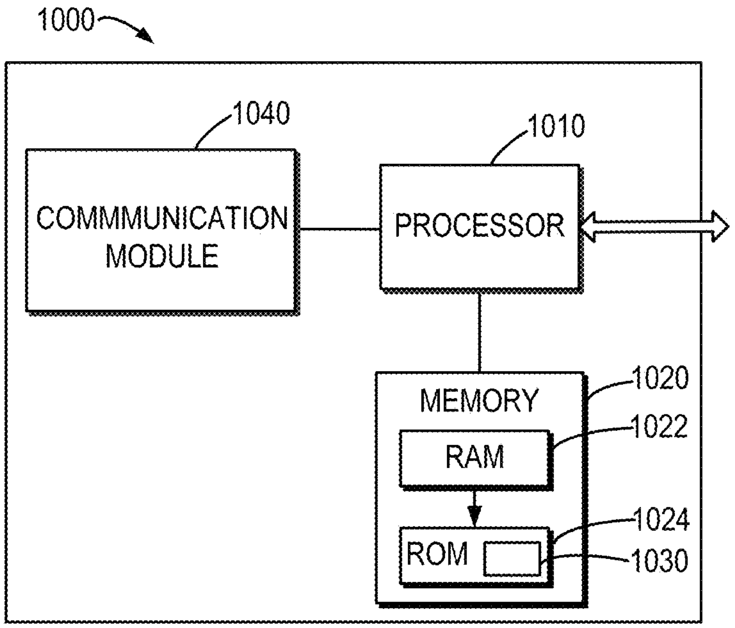
FIG. 10 illustrates a simplified block diagram of a device that is suitable for implementing example embodiments of the present disclosure.

FIG. 10 illustrates a simplified block diagram of a device 1000 that is suitable for implementing example embodiments of the present disclosure. The device 1000 may be provided to implement a communication device, for example the first network device 110, the second network device 120, the third network device 130 and the terminal device 140 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communications. The communication interface may represent any interface that is necessary for communications with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The computer program 1030 may be stored in the ROM 1024. The processor 1010 may perform any suitable actions and processing by loading the computer program 1030 into the RAM 1022.

The example embodiments of the present disclosure may be implemented by means of the computer program 1030 so that the device 1000 may perform any process of the disclosure as discussed with reference to various figures. The example embodiments of the present disclosure may also be implemented by hardware or by a combination of software and hardware.

In some example embodiments, the computer program 1030 may be tangibly contained in a computer readable medium which may be included in the device 1000 (such as in the memory 1020) or other storage devices that are accessible by the device 1000. The device 1000 may load the computer program 1030 from the computer readable medium to the RAM 1022 for execution. The computer readable medium may include any types of tangible non-volatile storage, such as ROM, EPROM, a flash memory, a hard disk, CD, DVD, and the like.

Figure 11:
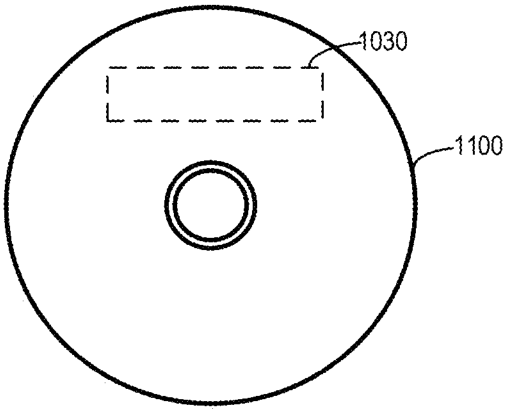
FIG. 11 illustrates a block diagram of an example computer readable medium in accordance with some example embodiments of the present disclosure.

FIG. 11 illustrates a block diagram of an example computer readable medium 1100 in accordance with some example embodiments of the present disclosure. In the example of FIG. 11, the computer readable medium 1100 is in form of CD or DVD. The computer readable medium 1100 has the computer program 1030 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods and processes as described above with reference to various figures. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:

in accordance with a determination, by a first network device having a first path with a second network device, that a terminal device is to be handed over from the second network device to a third network device, establishing a second path between the first and third network devices;

disabling data transmission for the terminal device from the first network device to the second network device via the first path;

transmitting, to the second network device, a handover indication for the terminal device to cause the second network device to suspend transmission of buffered data to the terminal device and to transmit remaining data of the buffered data to the third network device; and in accordance with reception, from the second network device, of a completion indication that transmission of the remaining data is complete, enabling data transmission for the terminal device from the first network device to the third network device via the second path.

2. The method of claim 1, further comprising:

in accordance with reception, from an external device, of data to be transmitted to the terminal device after disabling the data transmission via the first path and prior to enabling the data transmission via the second path, buffering the data in a buffer of the first network device, the external device being outside a network including the first, second and third network devices.

3. The method of claim 2, further comprising:

in accordance with the enabling of the data transmission via the second path, transmitting the remaining data in the buffer to the third network device via the second path.

4. The method of claim 2, wherein a size of the buffer is determined based on at least one of the following:

duration for the terminal device to be handed over from the second network device to the third network device, a data rate of the transmission of the remaining data, or a capability of the terminal device.

5. The method of claim 1, wherein disabling the data transmission via the first path comprises:

changing a state of the first path from an active state to a standby state.

6. The method of claim 5, further comprising at least one of the following:

in accordance with a determination that the terminal device connects to the second network device, changing the state of the first path from a null state to the active state;

in accordance with reception of the completion indication, changing the state of the first path from the standby state to the null state; or in accordance with a determination that the terminal device disconnects from a network including the first, second and third network devices, changing the state of the first path from the standby state or the active state to the null state.

7. The method of claim 1, wherein enabling the data transmission via the second path comprises:

changing a state of the second path from a pending state to an active state.

8. The method of claim 7, further comprising at least one of the following:

in accordance with the establishing of the second path, changing the state of the second path from a null state to the pending state;

in accordance with a determination that a timer expires, changing the state of the second path from the pending state to the active state; or in accordance with a determination that the terminal device disconnects from a network including the first, second and third network devices, changing the state of the second path from the pending state to the null state.

9. The method of claim 1, further comprising:

prior to the terminal device being handed over from the second network device to the third network device, receiving data generated by the terminal device from the second network device via the first path; and transmitting the data generated by the terminal device to an external device outside a network including the first, second and third network devices.

10. The method of claim 1, further comprising:

after the terminal device is handed over from the second network device to the third network device, receiving data generated by the terminal device from the third network device via the second path; and transmitting the data generated by the terminal device to an external device outside a network including the first, second and third network devices.

11. The method of claim 1, further comprising:

in accordance with reception, from the third network device, of a request for establishing the second path, determining that the terminal device is to be handed over from the second network device to the third network device.

12. The method of claim 11, wherein each of the request, the handover indication, and the completion indication is transmitted in a protocol message based on a control protocol between the first, second and third network devices.

13. The method of claim 12, wherein the protocol message comprises at least one of the following:

a first information element indicating whether the protocol message is a request, a response, or an indication, a second information element indicating whether the protocol message is a request for establishing a path, if the first information element indicates a request or a response, and indicating whether the protocol message is a handover indication or a completion indication, if the first information element indicates an indication, a third information element indicating the number of information elements in the protocol message, a fourth information element indicating a media access control address of the second network device, a fifth information element indicating a media access control address of the third network device, or a sixth information element indicating a media access control address of the terminal device.

14. The method of claim 1, wherein the first network device comprises a root access point in a Wi-Fi mesh network, and each of the second and third network devices comprises a non-root access point in the Wi-Fi mesh network.

15. A first network device comprising:

at least one processor; and at least one memory storing computer program codes;

the at least one memory and the computer program codes being configured, with the at least one processor, to cause the first network device to:

in accordance with a determination, by the first network device having a first path with a second network device, that a terminal device is to be handed over from the second network device to a third network device, establish a second path between the first and third network devices;

disable data transmission for the terminal device from the first network device to the second network device via the first path;

transmit, to the second network device, a handover indication for the terminal device to cause the second network device to suspend transmission of buffered data to the terminal device and to transmit remaining data of the buffered data to the third network device; and in accordance with reception, from the second network device, t a completion indication that transmission of the remaining data is complete, enable data transmission for the terminal device from the first network device to the third network device via the second path.

16. A non-transitory computer readable medium comprising program instructions, which when executed by a processor, cause an apparatus including the processor to perform at least the method of claim 1.

* * * * *